(12) United States Patent
Sueyoshi et al.

(10) Patent No.: US 7,487,203 B2
(45) Date of Patent: Feb. 3, 2009

(54) DATA-PROCESSING APPARATUS, DATA-PROCESSING METHOD AND PROGRAM

(75) Inventors: Masahiro Sueyoshi, Kanagawa (JP); Fumio Kubono, Tokyo (JP); Kei Tateno, Tokyo (JP)

(73) Assignee: Sony Corporation, Tokyo (JP)

( * ) Notice: Subject to any disclaimer, the term of this patent is extended or adjusted under 35 U.S.C. 154(b) by 723 days.

(21) Appl. No.: 10/283,210

(22) Filed: Oct. 30, 2002

(65) Prior Publication Data
US 2003/0088618 A1 May 8, 2003

(30) Foreign Application Priority Data
Oct. 31, 2001 (JP) ............................. 2001-335583

(51) Int. Cl.
*G06F 15/16* (2006.01)
(52) U.S. Cl. ........................... 709/203; 709/229; 726/3
(58) Field of Classification Search ......... 709/201–203, 709/217–219, 229; 726/3
See application file for complete search history.

(56) References Cited

U.S. PATENT DOCUMENTS

| | | | |
|---|---|---|---|
| 6,249,869 B1 * | 6/2001 | Drupsteen et al. | 713/172 |
| 6,609,199 B1 * | 8/2003 | DeTreville | 713/172 |
| 6,707,812 B1 * | 3/2004 | Bowman-Amuah | 370/353 |
| 6,708,273 B1 * | 3/2004 | Ober et al. | 713/189 |
| 2001/0050918 A1 * | 12/2001 | Surprenant et al. | 370/442 |
| 2001/0055308 A1 * | 12/2001 | Afrakhteh et al. | 370/401 |
| 2002/0001301 A1 * | 1/2002 | Sarkissian et al. | 370/352 |

FOREIGN PATENT DOCUMENTS

| | | |
|---|---|---|
| JP | 2002-170063 | 6/2002 |
| WO | WO 01/24475 | 4/2001 |

OTHER PUBLICATIONS

Effective use of networked reconfigurable resources, Military Applications of programmable logic devices, laurel, MD, Sep. 2001.*

* cited by examiner

*Primary Examiner*—Jason D Cardone
*Assistant Examiner*—Mitra Kianersi
(74) *Attorney, Agent, or Firm*—Oblon, Spivak, McClelland, Maier & Neustadt, P.C.

(57) ABSTRACT

How to allow requests and data, which are relevant to a service using an IC (Integrated Circuit), to be exchanged among a SAM unit serving as a data-processing apparatus, a server and the integrated circuit with a high degree of efficiency in an operation to render the service. The server transmits a first command requesting an IC module (the integrated circuit cited above) of a portable communication apparatus to carry out processing to the SAM unit. The SAM unit interprets the first command and transmits a second command for operating the IC module in accordance with a result of interpretation of the first command to the IC module by way of the server. The IC module carries out the processing in accordance with the second command and transmits a first response containing a result of the processing to the SAM unit by way of the server. If an outcome of the judgment formed on basis of the first response indicates that the above processing has been completed, the SAM unit transmits a second response indicating completion of the processing to the server.

23 Claims, 32 Drawing Sheets

SOFTWARE CONFIGURATION OF SAM MODULE

F I G. 7

| AP Resource Element Type Number | APE TYPES |
|---|---|
| 0x0001 | AP RESOURCE KEY K_APR |
| 0x0002 | IC SYSTEM KEY |
| 0x0003 | IC DIVISION KEY |
| 0x0004 | IC AREA KEY |
| 0x0005 | IC SERVICE KEY |
| 0x0006 | IC DEGENERATION KEY |
| 0x0007 | KEY REFERRED TO BY MACRO SCRIPT |
| 0x0008 | FILE SYSTEM INFORMATION(EXAMPLE:LOG NEGATIVE JOURNAL) |
| 0x0009 | JOURNAL FILE FOR RECORDING IN THE EVENT OF A FAILURE |
| 0x000A | FILE FOR FILE SYSTEM SIGNATURE KEYS |
| 0x000B | MUTUAL AUTHENTICATION KEY FOR SAM Mgr |
| 0x000C | RELATED TO KEY FOR MUTUAL AUTHENTICATION BETWEEN SAMs (ALSO FOR MUTUAL AUTHENTICATION BETWEEN APs IN SAME SAM) |
| 0x000D | INTER-SAM KEY PACKAGE KEY |
| 0x000E | MACRO SCRIPT |
| 0x000F | MANUFACTURING KEY PACKAGE |
| 0x0010 | EXTENDED-ISSUANCE KEY PACKAGE |
| 0x0011 | ISSUANCE KEY PACKAGE |
| 0x0012 | MEMORY DIVISION KEY PACKAGE |
| 0x0013 | MEMORY DIVISION KEY ELEMENT PACKAGE |
| 0x0014 | AREA CATALOGING KEY PACKAGE |
| 0x0015 | AREA DELETION KEY PACKAGE (INTERNALLY GENERATED) |
| 0x0016 | SERVICE CATALOGING KEY PACKAGE (INTERNALLY GENERATED) |
| 0x0017 | SERVICE DELETION KEY PACKAGE (INTERNALLY GENERATED) |
| 0x0018 | KEY CHANGE PACKAGE (INTERNALLY GENERATED) |
| 0xff00 | Manufacture Key |

IC ACCESS KEYS (rows 0x0002–0x0005)

F I G. 9
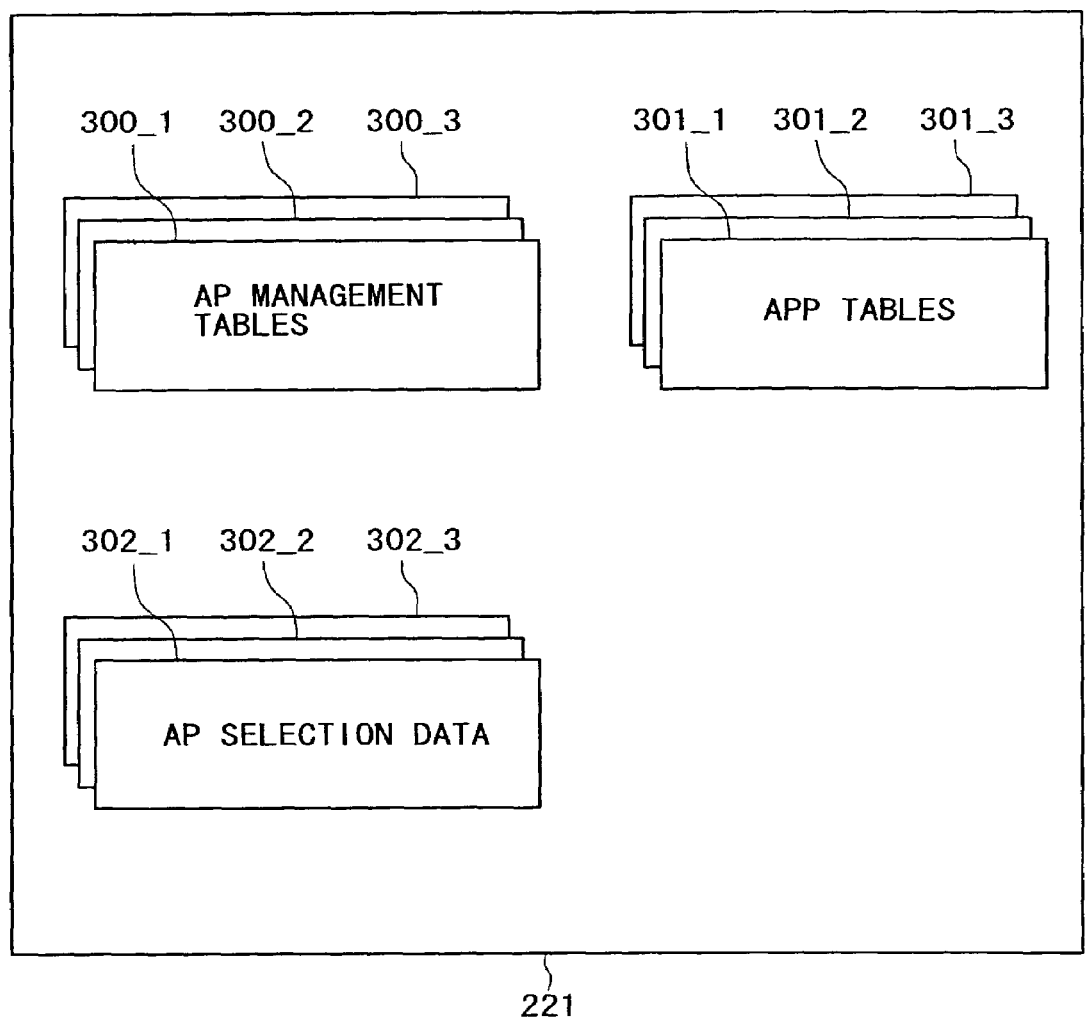

FIG. 10

| APE_N | APE_ID | | IEI | APE_N PARTNER SAM_ID | APE_N PARTNER AP_ID | K_CARDA | K_SAM | SET_APP |
|---|---|---|---|---|---|---|---|---|
| | APE_TYPE | APE_INS_NUM | | | | | | |
| Service A | IC Access Key | 1008 | INTERNAL | ITS OWN SAM_ID | N/A | XX1,...XXn | N/A | N/A |
| Service C | IC Access Key | 101C | INTERNAL | 43.17.19.19 | 1 | YY1,...YYn | TT1,...TTn | 301_1 |
| Service B | IC Access Key | 100C | EXTERNAL | 43.13.137.1 | 2 | OBTAIN KEYS FROM SAM GROUP AND HOLD HOLDABLE KEYS | SS1,...SSn | 301 OF OTHER SAMs |
| Service B log | FILE SYSTEM CONFIGURATION | Collection ID | EXTERNAL | 43.13.137.1 | 2 | OBTAIN KEYS FROM SAM GROUP AND HOLD HOLDABLE KEYS | SS1,...SSn | 301 OF OTHER SAMs |

| APE_ID | READ | WRITE | EXECUTE |
|---|---|---|---|
| Service B Access Key | 1 | 0 | 1 |
| Service B log | 1 | 1 | 0 |
| Service B log2 | 1 | 0 | 0 |
|  |  |  |  |
| AREA CATALOGING KEY PACKAGE | 1 | 0 | 0 |
| AREA DELETION KEY PACKAGE | 1 | 0 | 0 |

301_1

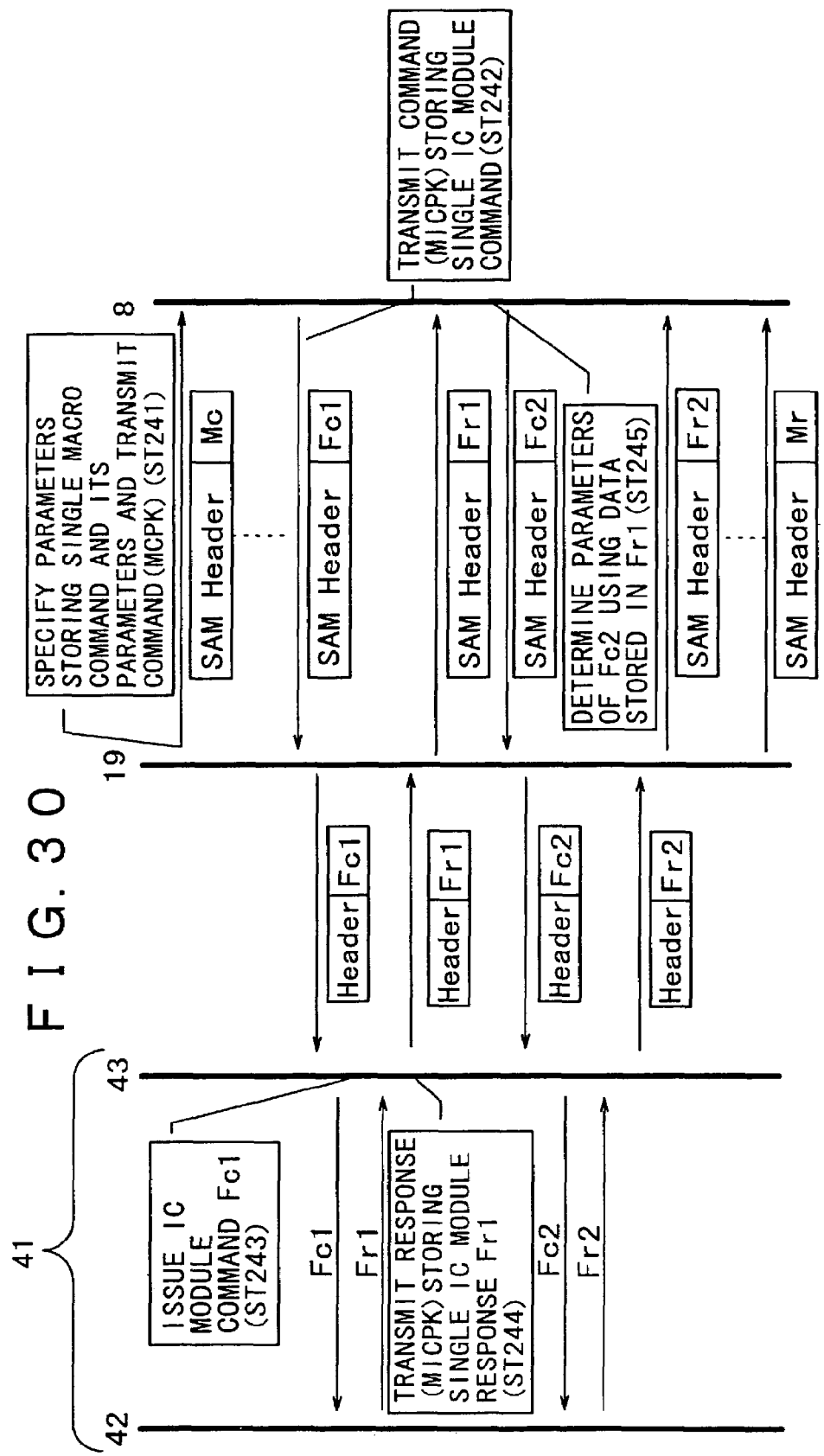

FIG. 31

| | NAME OF MICRO COMMAND EXECUTION PATTERN | IMPLEMENTATION OR COMMANDS TO BE UTILIZED |
|---|---|---|
| 1st COMMUNICATION METHOD | SINGLE MODE | REQUEST SYSTEM CODE, READ BLOCK, WRITE BLOCK |
| 2nd COMMUNICATION METHOD | PRE DEFINED MODE | ISSUANCE SYSTEM COMMANDS PAIRED WITH CHANGE SYSTEM BLOCK SUCH AS RESISTER SERVER, RESISTER AREA |
| 3rd COMMUNICATION METHOD | MULTI SUBMITTED MODE | COMMANDS ADOPTING 1st AND 2nd COMMUNICATION METHODS |
| 4th COMMUNICATION METHOD | COLLABORATIVE SINGLE MODE | COMMANDS REQUIRING RELATED PROCESSING ON SAM SIDE WITH AUTHENTICATIONS 1 AND 2 BY HANDSHAKING OR SEPARATE AND REGISTER ISSUE ID |

DATA-PROCESSING APPARATUS, DATA-PROCESSING METHOD AND PROGRAM

BACKGROUND OF THE INVENTION

The present invention relates to a data-processing apparatus and a data-processing method, which are used for rendering services using integrated circuits (ICs), as well as relates to a program for implementing the data-processing method.

Nowadays, there has been developed a communication system for carrying out transactions through a network such as the Internet by using an IC module incorporated in an IC card and portable communication apparatus.

In such a communication system, at a request made by a predetermined service-rendering enterprise rendering a predetermined service using the IC module, a SAM (Secure Application Module) unit executes an application program implementing procedural processing prescribed by the service-rendering enterprise. The SAM unit is typically connected to a network by a server. Communications between the SAM unit and the IC module are carried out through the server and the network. The SAM unit carries out processing such as authentication of a user and encryption as well as decryption of data by execution of the application program at a processing request made by a reader/writer unit of the IC module, a PC (Personal Computer) or a portable communication apparatus.

In the communication system described above, it is necessary to exchange a variety of requests and various kinds of data among the SAM unit, the IC module and the server with a high degree of efficiency. In addition, if the IC module is mounted on the portable communication apparatus or the like, a communication line for exchanging requests and data becomes instable due to an environment for propagating signals representing the requests and the data or other causes. Also in such an environment, it is necessary to exchange the requests and the data with a high degree of efficiency.

SUMMARY OF THE INVENTION

It is thus an object of the present invention addressing the problems encountered in the conventional art as described above to provide a data-processing apparatus capable of exchanging a variety of requests and various kinds of data, which are relevant to a rendered service using an IC (Integrated Circuit), among the SAM unit (the data processing apparatus), the IC and the server with a high degree of efficiency in processing to render the service, provide a data-processing method adopted by the data-processing apparatus and provide a program implementing the data-processing method.

In order to achieve the object described above, in accordance with a first aspect of the present invention, there is provided a communication method using an integrated circuit, a server and a data-processing apparatus for providing a predetermined service by carrying out communications with the integrated circuit through the server wherein:

the server transmits a first command including a command requesting the integrated circuit to carry out processing to the data-processing apparatus;

the data-processing apparatus interprets the command included in the first command and transmits a second command for operating the integrated circuit in accordance with a result of interpretation of the first command to the integrated circuit by way of the server;

the integrated circuit carries out the processing in accordance with the second command and transmits a first response containing a result of the processing to the data-processing apparatus by way of the server; and the data-processing apparatus forms a judgment as to whether or not the processing requested by the first command has been completed on the basis of the first response and, if an outcome of the judgment indicates that the processing has been completed, transmits a second response indicating completion of the processing to the server.

It is desirable to provide an implementation of the communication method wherein:

the first and second command and the first and second response exchanged between the server and the data-processing apparatus include an indicator indicating whether or not the server or the data-processing apparatus needs to carry out an operation for the processing carried out by the integrated circuit; and on the basis of the indicator, the server or the data-processing apparatus carries out the operation to the first and second command or the first and second response.

It is desirable to provide an implementation of the communication method wherein:

the first and second command and the first and second response exchanged between the server and the data-processing apparatus include an indicator indicating whether a communication route between the server and the data-processing apparatus is to be established as a permanent communication route or a temporary communication route which exists only during a session of exchanging the first command and the second response; and the server and the data-processing apparatus establish the communication route in accordance with the indicator and exchange the first command and the second response through the established communication route.

In accordance with a second aspect of the present invention, there is provided a data-processing apparatus used for providing a predetermined service by carrying out communications with an integrated circuit through a server and provided with an interface means for carrying out communications with the server as well as provided with a control means for:

receiving a first command including a command requesting the integrated circuit to carry out processing from the server;

interpreting the command included in the first command;

transmitting a second command for operating the integrated circuit in accordance with a result of interpretation of the first command to the integrated circuit by way of the server;

receiving a first response containing a result of the processing carried out by the integrated circuit in accordance with the second command from the server which has received the first response from the integrated circuit; and forming a judgment as to whether or not the processing requested by the first command has been completed on the basis of the first response and, in the case of an outcome of the judgment indicating that the processing has been completed, transmitting a second response indicating completion of the processing to the server.

In accordance with a third aspect of the present invention, there is provided a program, which is to be executed by a data-processing apparatus for providing a predetermined service by carrying out communications with an integrated circuit through a server and comprises procedures of:

receiving a first command including a command requesting the integrated circuit to carry out processing from the server;

interpreting the command included in the first command;

transmitting a second command for operating the integrated circuit in accordance with a result of interpretation of the first command to the integrated circuit by way of the server;

receiving a first response containing a result of the processing carried out by the integrated circuit in accordance with the second command from the server which has received the first response from the integrated circuit; and forming a judgment as to whether or not the processing requested by the first command has been completed on the basis of the first response and, in the case of an outcome of the judgment indicating that the processing has been completed, transmitting a second response indicating completion of the processing to the server.

In accordance with a fourth aspect of the present invention, there is provided a communication method using an integrated circuit, a server and a data-processing apparatus for providing a predetermined service by carrying out communications with the integrated circuit through the server wherein:

the server transmits a first command including a single first command requesting the integrated circuit to carry out processing to the data-processing apparatus;

the data-processing apparatus interprets the single first command included in the first command and transmits a second command including a single second command for operating the integrated circuit in accordance with a result of interpretation of the first single command to the integrated circuit by way of the server;

the integrated circuit carries out the processing in accordance with the single second command and transmits a first response including a single response containing a result of the processing to the data-processing apparatus by way of the server; and the data-processing apparatus transmits a second response including the single response to the server.

In accordance with a fifth aspect of the present invention, there is provided a data-processing apparatus used for providing a predetermined service by carrying out communications with an integrated circuit through a server and provided with an interface means for carrying out communications with the server as well as provided with a control means for:

receiving a first command including a single first command requesting the integrated circuit to carry out processing from the server;

interpreting the single first command included in the first command;

transmitting a second command including a single second command for operating the integrated circuit in accordance with a result of interpretation of the single first command to the integrated circuit by way of the server;

receiving a first response containing a single response indicating a result of the processing carried out by the integrated circuit in accordance with the single second command from the server which has received the first response from the integrated circuit; and transmitting a second response including the single response to the server.

In accordance with a sixth aspect of the present invention, there is provided a program, which is to be executed by a data-processing apparatus for providing a predetermined service by carrying out communications with an integrated circuit through a server and comprises procedures of:

receiving a first command including a single first command requesting the integrated circuit to carry out processing from the server;

interpreting the single first command included in the first command;

transmitting a second command including a single second command for operating the integrated circuit in accordance with a result of interpretation of the single first command to the integrated circuit by way of the server;

receiving a first response containing a single response indicating a result of the processing carried out by the integrated circuit in accordance with the single second command from the server which, has received the first response from the integrated circuit; and transmitting a second response including the single response to the server.

In accordance with a seventh aspect of the present invention, there is provided a communication method using an integrated circuit, a server and a data-processing apparatus for providing a predetermined service by carrying out communications with the integrated circuit through the server wherein:

the server transmits a first command including a single first command requesting the integrated circuit to carry out processing to the data-processing apparatus;

the data-processing apparatus interprets the single first command included in the first command and transmits a second command including a plurality of second commands each used for operating the integrated circuit in accordance with a result of interpretation of the single first command to the integrated circuit by way of the server;

the integrated circuit carries out the processing in accordance with the second commands and transmits a first response including a plurality of responses each containing a result of the processing to the data-processing apparatus by way of the server; and the data-processing apparatus transmits a second response including the responses to the server.

In accordance with an eighth aspect of the present invention, there is provided a data-processing apparatus used for providing a predetermined service by carrying out communications with an integrated circuit through a server and provided with an interface means for carrying out communications with the server as well as provided with a control means for:

receiving a first command including a single first command requesting the integrated circuit to carry out processing from the server;

interpreting the single first command included in the first command;

transmitting a second command including a plurality of second commands each used for operating the integrated circuit in accordance with a result of interpretation of the single first command to the integrated circuit by way of the server;

receiving a first response containing a plurality of responses each containing a result of the processing carried out by the integrated circuit in accordance with the second commands from the server which has received the first response from the integrated circuit; and transmitting a second response including the responses to the server.

In accordance with a ninth aspect of the present invention, there is provided a program, which is to be executed by a data-processing apparatus for providing a predetermined service by carrying out communications with an integrated circuit through a server and comprises procedures of:

receiving a first command including a single first command requesting the integrated circuit to carry out processing from the server;

interpreting the single first command included in the first command;

transmitting a second command including a plurality of second commands each used for operating the integrated circuit in accordance with a result of interpretation of the single first command to the integrated circuit by way of the server;

receiving a first response containing a plurality of responses each containing a result of the processing carried out by the integrated circuit in accordance with the second commands from the server which has received the first response from the integrated circuit; and transmitting a second response including the responses to the server.

In accordance with a tenth aspect of the present invention, there is provided a communication method using an integrated circuit, a server and a data-processing apparatus for providing a predetermined service by carrying out communications with the integrated circuit through the server wherein:

the server transmits a first command including a plurality of first commands each requesting the integrated circuit to carry out processing to the data-processing apparatus;

the data-processing apparatus interprets the first commands included in the first command and transmits a second command including a plurality of second commands each used for operating the integrated circuit in accordance with a result of interpretation of the first commands to the integrated circuit by way of the server;

the integrated circuit carries out the processing in accordance with the second commands and transmits a first response including a plurality of responses each containing a result of the processing to the data-processing apparatus by way of the server; and the data-processing apparatus transmits a second response including the responses to the server.

In accordance with an eleventh aspect of the present invention, there is provided a data-processing apparatus used for providing a predetermined service by carrying out communications with an integrated circuit through a server and provided with an interface means for carrying out communications with the server as well as provided with a control means for:

receiving a first command including a plurality of first commands each requesting the integrated circuit to carry out processing from the server;

interpreting the first commands included in the first command;

transmitting a second command including a plurality of second commands each used for operating the integrated circuit in accordance with a result of interpretation of the first commands to the integrated circuit by way of the server;

receiving a first response containing a plurality of responses each containing a result of the processing carried out by the integrated circuit in accordance with the second commands from the server which has received the first response from the integrated circuit; and transmitting a second response including the responses to the server.

In accordance with a twelfth aspect of the present invention, there is provided a program, which is to be executed by a data-processing apparatus for providing a predetermined service by carrying out communications with an integrated circuit through a server and comprises procedures of:

receiving a first command including a plurality of first commands each requesting the integrated circuit to carry out processing from the server;

interpreting the first commands included in the first command;

transmitting a second command including a plurality of second commands each used for operating the integrated circuit in accordance with a result of interpretation of the first commands to the integrated circuit by way of the server;

receiving a first response containing a plurality of responses each containing a result of the processing carried out by the integrated circuit in accordance with the second commands from the server which has received the first response from the integrated circuit; and transmitting a second response including the responses to the server.

In accordance with a thirteenth aspect of the present invention, there is provided a communication method using an integrated circuit, a server and a data-processing apparatus for providing a predetermined service by carrying out communications with the integrated circuit through the server wherein:

the server transmits a first command including a single first command requesting the integrated circuit to carry out processing to the data-processing apparatus;

the data-processing apparatus interprets the single first command included in the first command and transmits a second command including a single second command for operating the integrated circuit in accordance with a result of interpretation of the first single command to the integrated circuit by way of the server;

the integrated circuit carries out the processing in accordance with the single second command included in the second command and transmits a response including a result of the processing to the data-processing apparatus by way of the server; and the data-processing apparatus transmits a third command including a single third command created by using the processing result included in the response to the integrated circuit by way of the server.

In accordance with a fourteenth aspect of the present invention, there is provided a data-processing apparatus used for providing a predetermined service by carrying out communications with an integrated circuit through a server and provided with an interface means for carrying out communications with the server as well as provided with a control means for:

receiving a first command including a single first command requesting the integrated circuit to carry out processing from the server;

interpreting the single first command included in the first command;

transmitting a second command including a single second command for operating the integrated circuit in accordance with a result of interpretation of the single first command to the integrated circuit by way of the server;

receiving a response from the server, which has received the response from the integrated circuit; and transmitting a third command including a single third command created by using a processing result included in the response to the integrated circuit by way of the server.

In accordance with a fifteenth aspect of the present invention, there is provided a program, which is to be executed by a data-processing apparatus for providing a predetermined service by carrying out communications with an integrated circuit through a server and comprises procedures of:

receiving a first command including a single first command requesting the integrated circuit to carry out processing from the server;

interpreting the single first command included in the first command;

transmitting a second command including a single second command for operating the integrated circuit in accordance with a result of interpretation of the single first command to the integrated circuit by way of the server;

receiving a response from the server, which has received the response from the integrated circuit; and transmitting a third command including a single third command created by using a processing result included in the response to the integrated circuit by way of the server.

BRIEF DESCRIPTION OF THE DRAWINGS

FIG. 7 is a table showing types of an application element APE of the application program AP shown in FIG. 6;

FIG. 9 is an explanatory diagram showing details of data stored in an AP management storage area shown in FIG. 5;

FIG. 10 is an explanatory diagram showing an AP management table stored in the AP management storage area as a part of the data shown in FIG. 9;

FIG. 11 is an explanatory diagram showing an APP table stored as a part of the data shown in FIG. 9;

FIG. 30 is an explanatory diagram showing a fourth communication technique of the multi-command/response method adopted in the communication system shown in FIG. 1;

FIG. 31 is an explanatory diagram showing a relation between the name of a macro command execution pattern and an implementation or commands to be utilized for the first to fourth communication techniques;

DETAILED DESCRIPTION OF THE PREFERRED EMBODIMENTS

Some preferred embodiments of the present invention are explained by referring to diagrams as follows.

Figure 1:
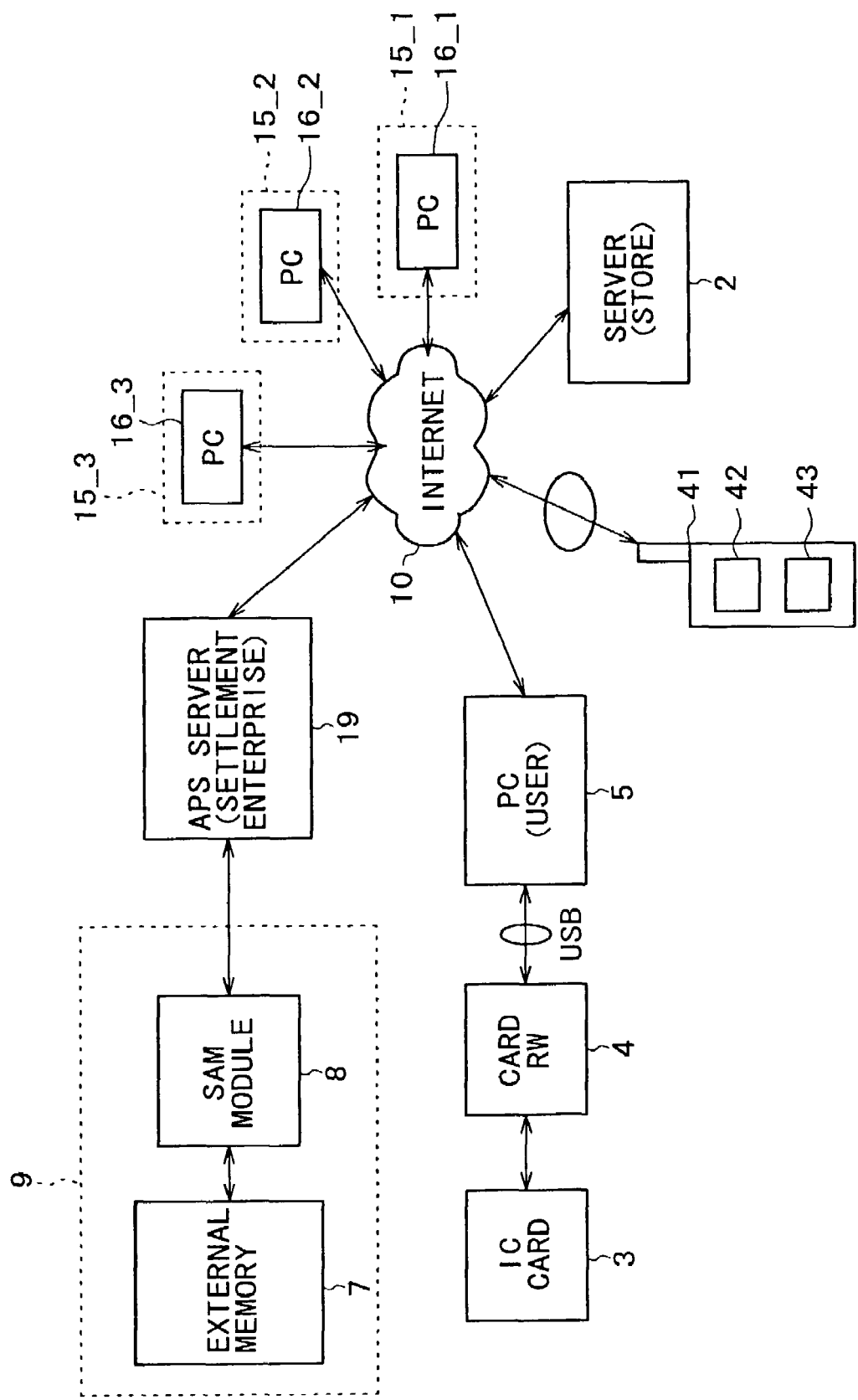
FIG. 1 is a diagram showing an overall configuration of a communication system implemented by an embodiment of the present invention.

FIG. 1 is a diagram showing an overall configuration of a communication system 1 implemented by an embodiment of the present invention.

As shown in FIG. 1, the communication system 1 carries out communication through the Internet 10 by using a server 2 installed at a store or the like, an IC card 3, a card reader/writer 4, a personal computer 5, personal computers 16_1 to 16_3, an ASP (Application Service Provider) server 19 (a server provided by the present invention), a SAM (Secure Application Module) unit 9 comprising a plurality of encryption modules and a portable communication apparatus 41 including an embedded IC module 42 (an integrated circuit provided by the present invention) in order to perform procedural processing such as a financial settlement process using the IC card 3 or the portable communication apparatus 41.

The SAM unit 9 comprises an external memory 7 and a SAM module 8 (a data-processing apparatus provided by the present invention).

If necessary, the SAM module 8 exchanges data with another SAM module not shown in the figure.

[Characteristics of the Communication System 1]

The SAM unit 9 communicates with the ASP server 19 serving as an upper-level computer of the SAM unit 9, the personal computer 5, which exchanges data with an IC module mounted on the IC card 3, and the portable communication apparatus 41 including the embedded IC module 42 functioning as a card. Communications between the SAM unit 9 and the IC module mounted on the IC card 3 as well as between the SAM unit 9 and the IC module 42 are carried out through the ASP server 19. In addition, the SAM unit 9 also exchanges commands of an IC-module system (or a card system) and commands of systems other than the IC-module system with the ASP server 19. However, the SAM unit 9 exchanges only the commands of an IC-module system with the personal computer 5 and the portable communication apparatus 41.

A communication line of a telephone network (or a portable-telephone network) used for communications with the portable communication apparatus 41 is instable and, in addition, the communication charges for such a telephone network are high. Furthermore, commands to operate the IC module 42 are entered sequentially and a limit is imposed on the size of data to be read out/written in an operation.

In the communication system 1, since a specific command group (an issuance group of commands) of the IC module system forms a pattern for carrying out processing in accordance with a fixed execution sequence, the SAM module 8 is provided with a function for automatically interpreting such a command group and processing the commands included in the group even if the commands are not specified individually one after another in the ASP server 19.

In addition, in the communication system 1, in some issuance-group commands of the IC module, the use of IC-module-specific data managed in the SAM unit 9 as a parameter of the next command is assumed. The aforementioned issuance-group commands include a command for dividing a storage area of the IC module and a command relevant to authentication with respect to a new storage area obtained as a result of the division of the storage area. In this case, the SAM unit 9 computes a value of the parameter specified in the command to be executed next from the contents of a response to a command executed initially on the basis of a predetermined algorithm.

In the communication system 1, since the SAM unit 9 provides a communication protocol for letting the IC module and the ASP server 19 get familiar with each other, the magnitude of a processing load borne by the ASP server 19 is reduced.

The communication system 1 prescribes a communication protocol related to operations carried out by the SAM unit 9 on the IC module in the format of a protocol of communication between the SAM unit 9 and the ASP server 19. In addition, in a configuration wherein one server 19 is connected to a plurality of SAM units 19, the communication system 1 establishes connections for distributing a load of processing related to the IC module among the SAM unit 9. Furthermore, the communication system 1 adopts a multi-command communication technique allowing commands to be exchanged with a high degree of efficiency among the SAM unit 9, the ASP server 19, the personal computer 5 and the portable communication apparatus 41.

Elements of the configuration shown in FIG. 1 are described as follows.

[IC Card 3 and Portable Communication Apparatus 41]

As shown in FIG. 1, the portable communication apparatus 41 has an IC (Integrated Circuit) module 42 and a communication processing unit 43.

Figure 2:
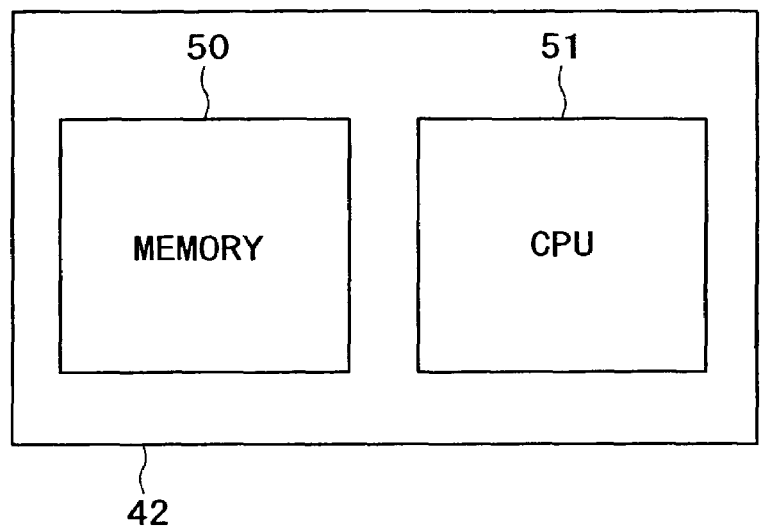
FIG. 2 is a functional block diagram showing an IC card used in the communication system shown in FIG. 1.

FIG. 2 is a functional block diagram showing the IC module 42 used in the communication system shown in FIG. 1. As shown in FIG. 2, the IC module 42 has a memory 50 and a CPU 51.

Figure 3:
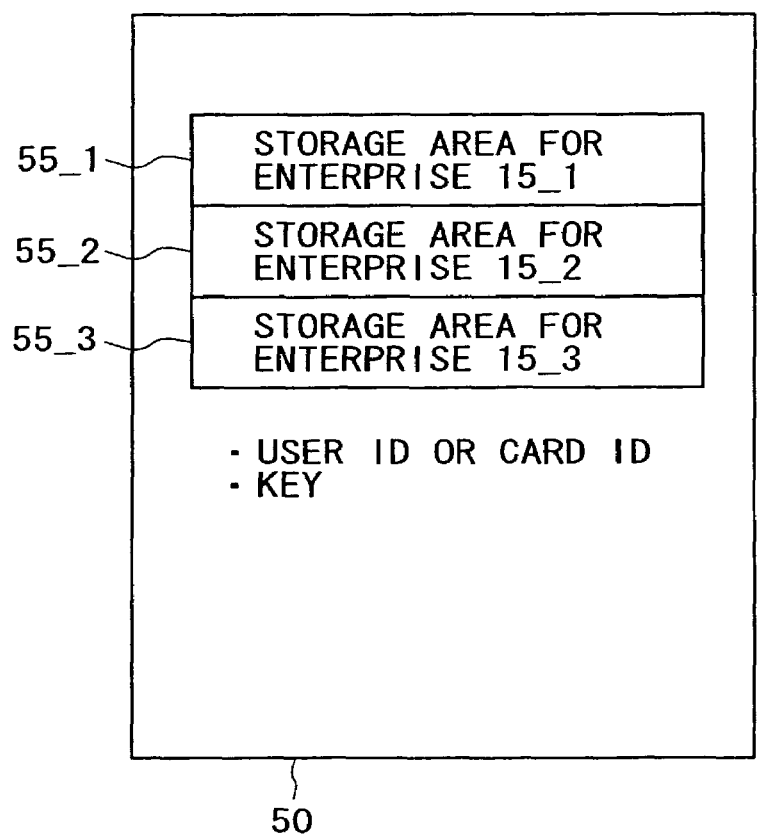
FIG. 3 is an explanatory diagram showing a memory employed in the IC card shown in FIG. 2.

As shown in FIG. 3, the memory 50 includes a storage area 55_1 used by a service-rendering enterprise 15_1 such as a credit card company, a storage area 55_2 used by a service-rendering enterprise 15_2 and a storage area 55_3 used by a service-rendering enterprise 15_3. In addition, the memory 50 is used for storing a key used for determining a right of an access to the storage area 55_1, a key used for determining a right of an access to the storage area 55_2 and a key used for determining a right of an access to the storage area 55_3. The keys are used for, among other purposes, mutual authentication, encryption of data and decryption of data. Furthermore, the memory card 50 is also used for storing the ID of the IC card 3 or the ID of a user of the IC card 3.

The communication processing unit 43 has a function for communicating with the ASP server 19 through a portable-telephone network and the Internet 10 and a function for exchanging data with the IC module 42.

The IC card 3 includes the same IC module as the IC module 42 shown in FIG. 2. However, the IC card 3 also has a function for exchanging data with the card reader/writer 4.

It is to be noted that, processing using the IC card 3 is carried out in the same way as processing using the portable communication apparatus 41, and processing using the IC module 42 is carried out in the same way as processing carried out by using the IC module 3 mounted in the IC card 3. Thus, only the processing using the portable communication apparatus 41 and the IC module 42 is explained in the following description.

The SAM unit 9 is described in detail as follows. As explained earlier, the SAM unit 9 comprises an external memory 7 and a SAM module 8.

The SAM module 8 can be implemented as a semiconductor circuit or a device comprising a plurality of circuits accommodated in a box.

[Software Configuration of the SAM Module 8]

Figure 4:
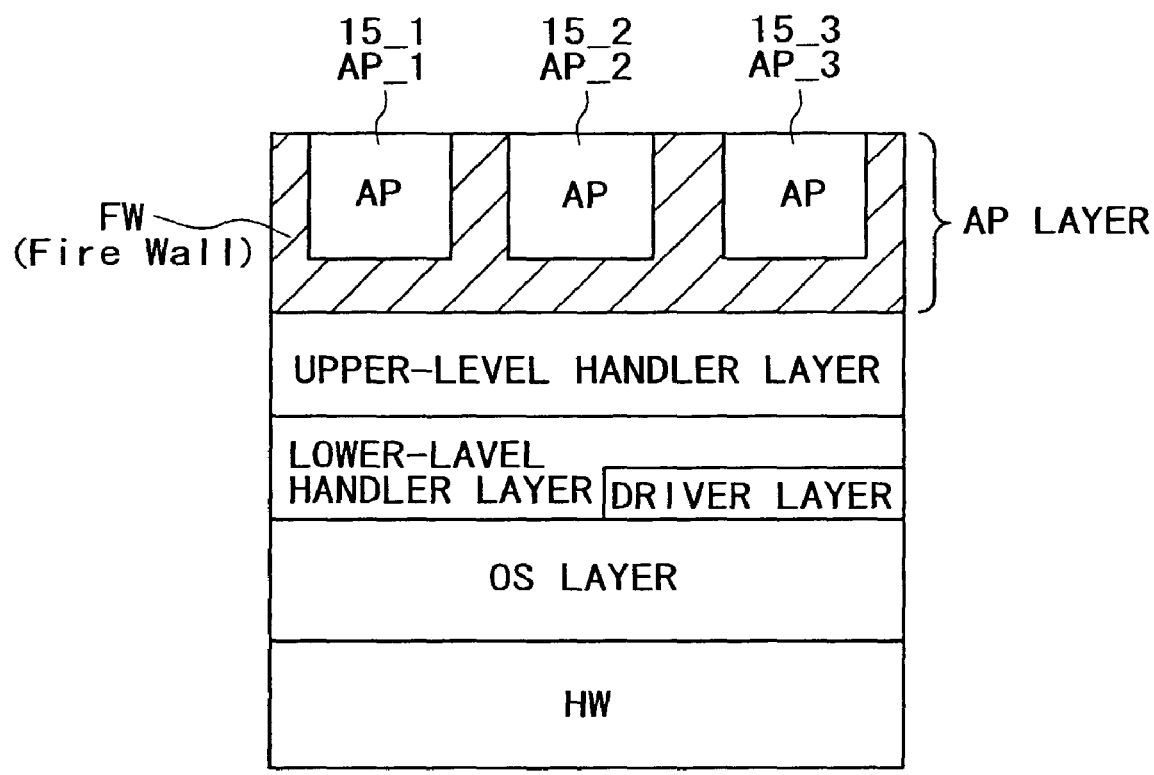
FIG. 4 is an explanatory diagram showing a software structure of a SAM module used in the communication system shown in FIG. 1.

The SAM module 8 has a software configuration like one shown in FIG. 4. As shown in FIG. 4, the SAM module 8 includes a hardware (HW) layer, a driver (OS) layer, a lower-level handler layer, an upper-level handler layer and an application (AP) layer, which are stacked in the upward direction in the figure. The OS layer includes an RTOS kernel for peripheral hardware. The lower-level handler layer carries out processing in logically defined units. The upper-level handler layer includes libraries peculiar to applications.

The AP layer includes application programs AP_1, AP_2 and AP_3 (application programs provided by the present invention) prescribing procedures using the IC module 42 for respectively the service-rendering enterprises 15_1, 15_2 and 15_3 such as a credit card company shown in FIG. 1. The application programs AP_1, AP_2 and AP_3 are loaded from the external memory 7 for execution. In each of the application programs AP_1, AP_2 and AP_3, one or more macro-scripts can be set. The application programs are comprised of a plurality of application element APE as will be described later. At the AP layer, a fire wall FW is provided between any two of the application programs AP_1, AP_2 and AP_3 and between the application programs AP_1, AP_2 and AP_3 and the upper-level handler layer.

[External Memory 7]

Figure 5:
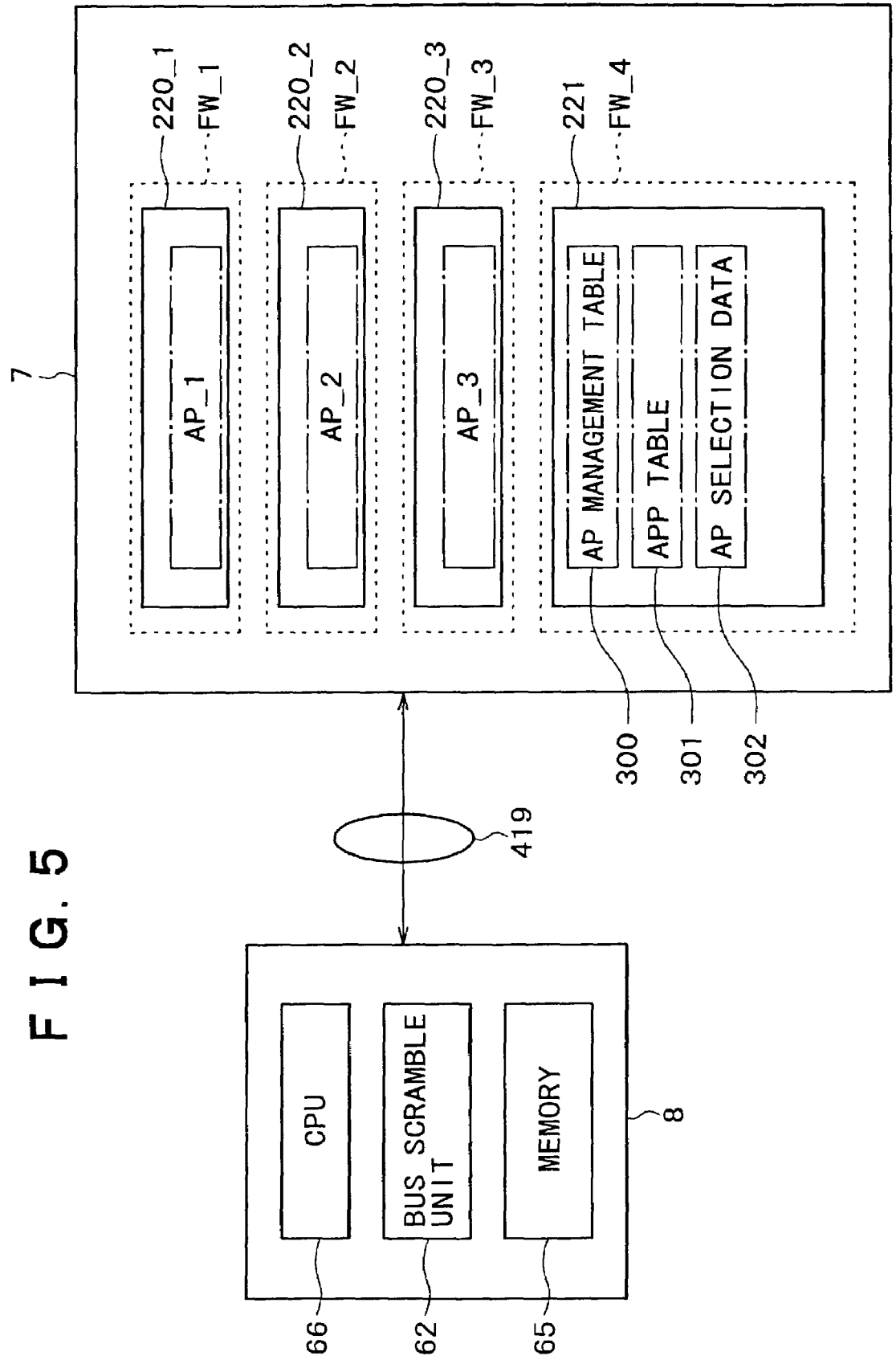
FIG. 5 is an explanatory diagram showing storage areas of an external memory used in the communication system shown in FIG. 1.

FIG. 5 is an explanatory diagram showing storage areas of the external memory 7. As shown in FIG. 5, the storage areas of the external memory 7 are an AP storage area 220_1 for storing the application program AP_1 of the service-rendering enterprise 15-1, an AP storage area 220_2 for storing the application program AP_2 of the service-rendering enterprise 15-2, an AP storage area 220_3 for storing the application program AP_3 of the service-rendering enterprise 15_3 and an AP management storage area 221 used by a person in charge of management of the SAM module 8.

The application program AP_1 stored in the AP storage area 220_1 comprises a plurality of application elements APE (first data modules according to the first to sixth aspects of the present invention) to be described later. Accesses to the AP storage area 220_1 are restricted by a fire wall FW_1.

By the same token, the application program AP_2 stored in the AP storage area 220_2 comprises a plurality of application elements APE. Accesses to the AP storage area 220_2 are restricted by a fire wall FW_2. Likewise, the application program AP_3 stored in the AP storage area 220_3 comprises a plurality of application elements APE. Accesses to the AP storage area 220_3 are restricted by a fire wall FW_3.

In this embodiment, the application element APE is a minimum unit downloaded into the external memory 7 from typically a source external to the SAM unit 9. The number of application elements APE configuring each application program is determined arbitrarily by the service-rendering enterprise associated with the application program.

In addition, the application programs AP_1, AP_2 and AP_3 stored in the external memory 7 have been scrambled so that, when the application programs AP_1, AP_2 and AP_3 are transferred to the SAM module 8, they must be de-scrambled.

Furthermore, the application programs AP_1, AP_2 and AP_3 are developed by the service-rendering enterprises 15_1, 15_2 and 15_3 respectively by using typically the personal computers 16_1, 16_2 and 16_3 respectively, which are shown in FIG. 1. Then, the application programs AP_1, AP_2 and AP_3 are downloaded to the external memory 7 by way of the SAM module 8.

Figure 6:
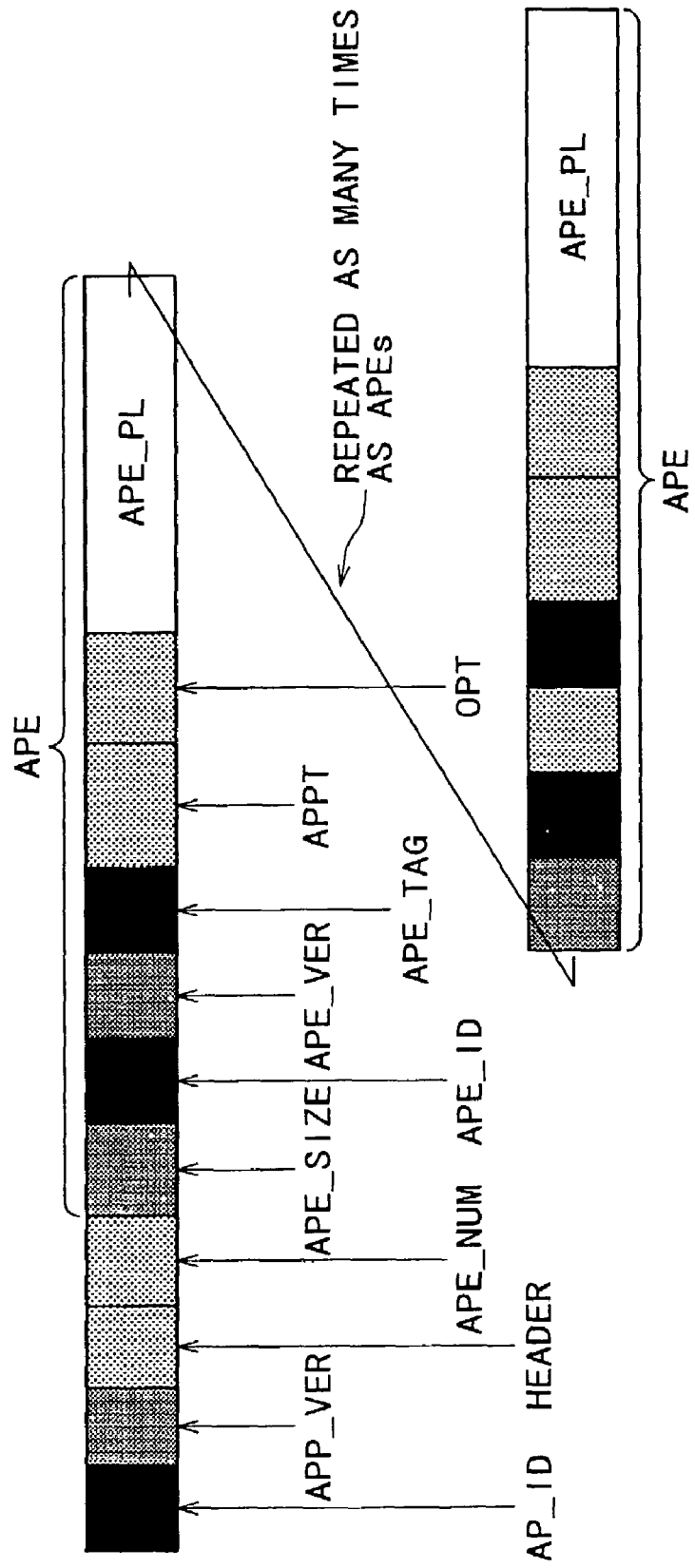
FIG. 6 is an explanatory diagram showing an application program AP stored in the external memory shown in FIG. 5.

The application programs AP_1, AP_2 and AP_3 are explained in detail as follows. An application program or a plurality of application programs exist in a SAM unit for each service-rendering enterprise. As shown in FIG. 6, the application program AP_1, AP_2 or AP_3, which is referred to hereafter simply as an AP, comprises an identification AP_ID, a version APP_VER, a header HEADER, an APE count APE_NUM and an application element APE or a plurality of application elements APE. AP_ID identifies the application program AP. APP_VER is the version of the application program, which is information on a generation of the application program AP. HEADER is head data to be used in processing such as backup processing described later. APE_NUM is the number of application elements APE in the application program AP. The identification AP_ID varies from service-rendering enterprise to service-rendering enterprise.

As shown in FIG. 6., an application element APE comprises a data size APE_SIZE, an identification APE_ID, a version APE_VER, a tag APE_TAG, a table identification APPT, an option OPT and main data APE_PL. APE_SIZE is the size of the application element APE. APE_ID identifies the application element APE. APE_VER is the version of the application element APE. APE_TAG is an identification (or a tag) of the application element APE. APE_TAG can be set by the service-rendering enterprise. APPT is used for identifying an APP table. OPT is used for specifying an option. APE_PL is the actual data of the application element APE.

The identification APE_ID comprises a type APE_TYPE and a number INS_NUM. APE_TYPE is the type of the application element APE. INS_NUM is an instance identification number serving as an identification number of the application element APE. INS_NUM is managed by the end user, which is a service-rendering enterprise.

Assume for example that the application element APE is a file system configuration. In this case, APE_TYPE is 2 and INS_NUM is 1. By using such APE_ID, each application element APE can be identified uniquely among application elements APE accommodated in the same SAM unit.

APE_VER can be set arbitrarily by the service-rendering enterprise.

In addition, it is necessary to uniquely define APE_TAG in each individual application program AP.

The application programs AP, namely, AP_1, AP_2 and AP_3, are encrypted in a device external to the SAM unit 9 by using an AP resource key K_APR as an encryption key before being stored in the external memory 7 shown in FIG. as an application program package APP. The AP resource key K_APR varies from application program to application program.

The following description explains APE_TYPE, which is the type of the application element APE explained above by referring to FIG. 6. FIG. 7 is a table showing typical APE_TYPE of an application element APE stored in an AP area. To be more specific, FIG. 7 is a table showing values of APE_TYPE and their descriptions. As shown in FIG. 7, an AP area is used for storing for example an AP resource key K_APR, a card access key, file system configuration data, a SAM mutual authentication key, an inter-SAM-key package key, an TC card (IC module) operation macro-command script program, a memory-division key package, an area-cataloging key package, an area-deletion key package, a service-cataloging key package and a service-deletion key package as application element APE.

[AP Resource Key K_APR]

The AP resource key K_APR is used as an encryption key in setting an application element APE. The AP resource key K_APR assigned to an AP area to be used for setting an application element APE varies from AP area to AP area.

[IC (Card) Access Key]

A card access key is a key used in operations to write and read out data into and from the IC card 3 and the memory 50 employed in the IC module 42. The card access key can be for example an IC card system key, an IC card area key, an IC card service key or an IC card degeneration key. The IC card degeneration key is generated by encryption using the IC card system key and a storage area management key for the memory 50 and used for mutual authentication. In addition, data referred to by the IC card (IC) operation macro-command script program is also included in the application element APE of the same type as the card access key.

[File System Configuration Data]

The file system configuration data can be for example log data, negative data or journal data. The log data is typically utilization-history data of an application element APE. The negative data is typically information on invalidation of an IC card. The journal data is typically history data of execution in the SAM unit.

In configuration of a file system, for example, an identification (specification, sorting or linking of a record key) of a file access is selected. In the case of a record key, a record size, a record overall count, a record signature version, a record signature method type, a record data size and a record signature key are set. In addition, when data is written into this file system from an external source, it is necessary to carry out processing such as an operation to specify whether or not signature authentication is to be implemented. In this case, a record is defined as a smallest unit of operations to write into or read out from file data.

[SAM Mutual Authentication Key]

The SAM mutual authentication key is used also in mutual authentication between APs in the same SAM unit. The SAM mutual authentication key is a key used in an access to the application element APE from another AP in the same SAM unit or from another SAM unit.

[Inter-SAM-Key Package Key]

The inter-SAM-key package key is an encryption key used in an operation to exchange data such as a card access key after mutual authentication between SAM units.

[IC Card (IC) Operation Macro-Command Script Program]

The IC card operation macro-command script program is created by the service-rendering enterprise itself. The IC card operation macro-command script program prescribes an order of processing related to the IC card 3 and IC module 42 as well as prescribes exchanges with the ASP server 19. The IC card operation macro-command script program is interpreted by the SAM module 8 to generate an entity of the IC card 3 (an entity of the IC module) after being set in the SAM unit 9.

[Memory-Division Key Package]

The memory-division key package is data used for dividing a storage area of the external memory 7 or a memory employed in the IC card 3 and the IC module 42 before the service-rendering enterprise starts an operation of a service using and the IC card 3 and the IC module 42.

[Area-Cataloging Key Package]

The area-cataloging key package is data used for cataloging an area in a storage area of the memory employed in the IC card 3 and in a storage area of the memory employed in the IC module 42 before the service-rendering enterprise starts an operation of a service using the IC card 3 and the IC module 42.

[Area-Deletion Key Package (Generated Internally)]

The area-deletion key package is a package that can be automatically generated inside the SAM unit from the card access key.

[Service-Cataloging Key Package (Generated Internally)]

The service-cataloging key package is used for cataloging the application element APE into the external memory 7 before the service-rendering enterprise starts an operation of a service using the IC card 3 and the IC module 42. The service-cataloging key package is a package that can be automatically generated inside the SAM unit from the card access key.

[Service-Deletion Key Package (Generated Internally)]

The service-deletion key package is used for deleting the application element APE from the external memory 7. The service-deletion key package is a package that can be automatically generated inside the SAM unit from the card access key.

The following description explains details of the macro command script program, which is also referred to hereafter simply as a script program, for IC card operations. The script program is a program prescribing a procedure of processing to be carried out by the IC module 3a employed in the IC card 3 and the IC module 42 employed in the portable communication apparatus 41 in execution of the application programs AP_1, AP_2 and AP_3 of the service-rendering enterprises 15_1, 15_2 and 15_3 respectively as well as the corresponding application program, which are running in the SAM module 8.

Figure 8:
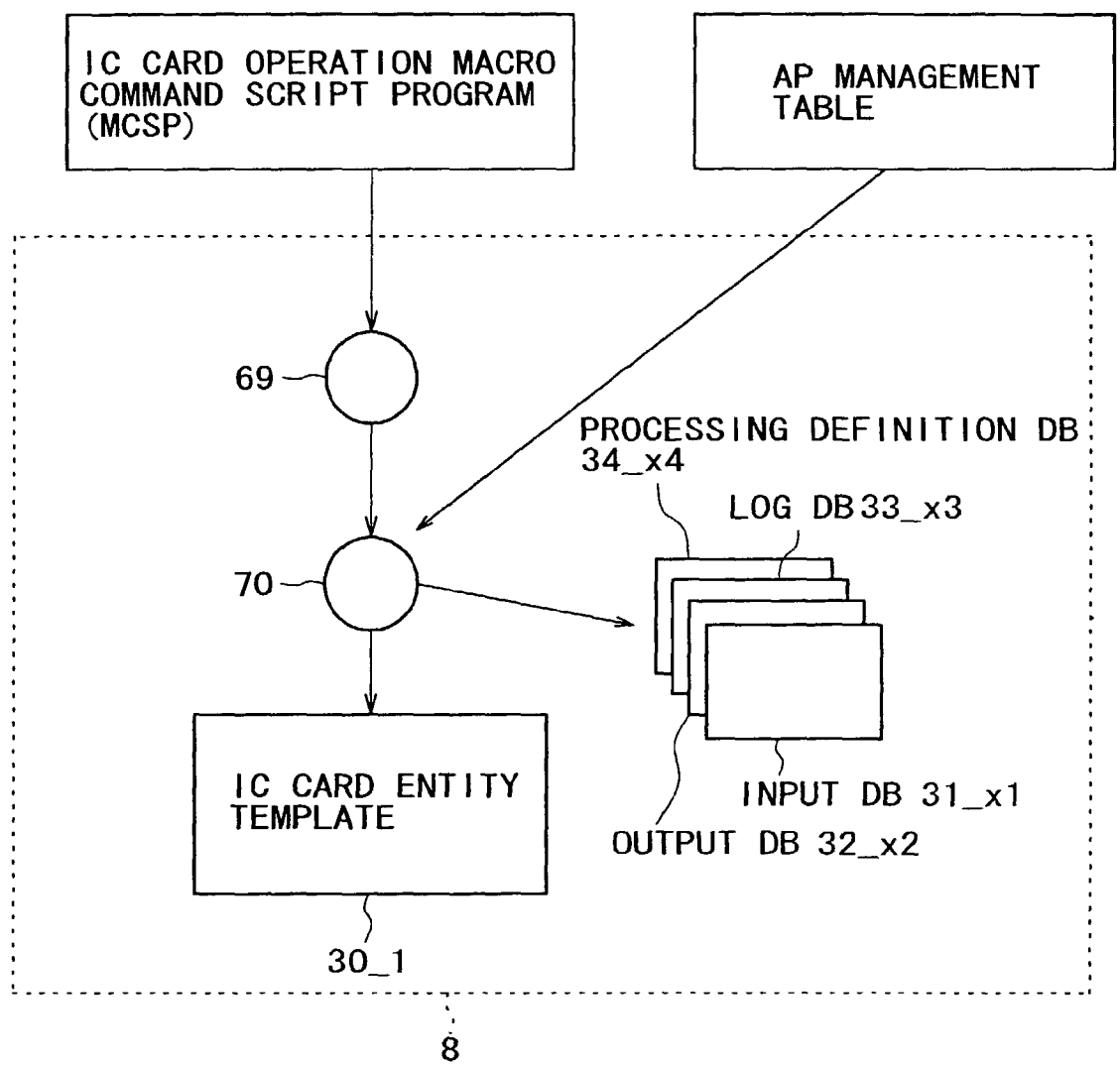
FIG. 8 is an explanatory diagram showing a command used in an IC card operation macro command script program.

In the case of this embodiment, as will be described later, processing is carried out on the basis of a script download task 69 and a script interpretation task 70 in the SAM module 8 to generate pieces of data from an AP management table and data provided by the script program as shown in FIG. 8. The pieces of data include an input data block 31_x1, an output data block 32_x2, a log data block 33_x3, a processing-definition data block 34_x4 and an IC card entity template 30_1 to be used in procedures related to the service-rendering enterprises 15_1, 15_2 and 15_3.

The following description explains data stored in an AP management storage area 221 of the external memory 7 shown in FIG. 5. An access to the AP management storage area 221 is restricted by a fire wall FW_4. It is to be noted that the fire wall FW_4 corresponds to the fire wall FW shown in FIG. 4.

FIG. 9 is an explanatory diagram showing details of the data stored in the AP management storage area 221. As shown in FIG. 9, the management storage area 221 is used for storing AP management tables 300_1, 300_2 and 300_3, APP tables 301_1, 301_2 and 301_3, pieces of selection data 302_1, 302_2 and 302_3, pieces of version management data 303_1, 303_2 and 303_3 as well as internal resource allocation management data 304 (access management data according to the fourth to sixth aspects of the present invention). It is to be noted that reference numeral 300 is a generic reference numeral for denoting any one of the AP management tables 300_1, 300_2 and 300_3. By the same token, reference numeral 301 is a generic reference numeral for denoting any one of the APP tables 301_1, 301_2 and 301_3. In the same way, reference numeral 302 is a generic reference numeral for denoting any one of the pieces of selection data 302_1, 302_2 and 302_3. Likewise, reference numeral 303 is a generic reference numeral for denoting any one of the pieces of version management data 303_1, 303_2 and 303_3.

The AP management tables 300_1, 300_2 and 300_3 as well as the APP tables 301_1, 301_2 and 301_3 are cataloged in advance typically at a set-up time of the SAM module 8. In addition, the AP management tables 300_1, 300_2 and 300_3 as well as the APP tables 301_1, 301_2 and 301_3 can be renewed only by a person in charge of management of the SAM module 8.

The AP management tables 300_1, 300_2 and 300_3 are prescribed for each application program AP. In addition, the APP tables 301_1, 301_2 and 301_3 are prescribed for each SAM mutual authentication key.

FIG. 10 is an explanatory diagram showing the AP management table 300_1. The AP management tables 300_2 and 300_3 each have the same format as the AP management table 300_1. As shown in FIG. 10, the AP management table 300_1 includes the name APE_N of each application element APE used and referenced by the IC-card-operation macro-command script program as well as an identification APE_ID, an internal/external identifier IET, a partner identification SAM_ID, a partner identification AP_ID, a key K_CARDA, a key K_SAM, data SET_APP, data FLAG_IP and data FLAG_STR, which are associated with the name APE_N.

The name APE_N of each application element APE is a name given to a service (an application element APE) provided by an application program of the service-rendering enterprise 15_1, 15_2 or 15_3. The name APE_N is an identifier referenced as a substitute for the service number of a service that can be used by the application program of each service-rendering enterprise.

The identification APE_ID is the ID of an application element APE.

The internal/external identifier IEI is a flag indicating an internal specification, which means that the physical substance of the application element APE exists or an external specification meaning that a reference is made from another SAM unit.

The identification SAM_ID is the SAM ID of the partner with which data is exchanged when the SAM module 8 carries out processing related to the application element APE.

The identification AP_ID is the identification of an application program executed in the SAM unit of the partner with which data is exchanged when the SAM module 8 carries out processing related to the application element APE.

The key K_CARDA is a key, which is used for exchanging data with the memory 50 employed in the IC card 3 when the SAM module 8 carries out processing related to the application element APE.

The key K_SAM is a key, which is used for exchanging data with another SAM unit when the SAM module 8 carries out processing related to the application element APE.

The data SET_APP is data for identifying the APP table 301_1, 301_2 or 301_3, which is used or referred to when the SAM module 8 carries out processing related to the application element APE.

APE_N's 'Service A' shown in FIG. 10 is an access key of the IC card 3 defined by an application program in the SAM module 8. The key 'Service A' is set as an undisclosed key so that this key cannot be referred to by an application program of another SAM unit and another application program of the same SAM unit.

A key service C is an access key of the IC card 3 defined by this application program. If a net mask of class C to be described later is assigned to this SAM unit, the key 'Service C' is disclosed to an application program in a SAM unit having SAM_ID of '43.17.19.XX'. In this case, the SAM mutual authentication key is 'TT1 . . . TTn' or another SAM unit determines whether or not the key 'Service C' can be held till the next utilization. If the key 'Service C' can be held till the next utilization, it is not necessary to again obtain a card access key from this SAM unit when another SAM unit uses the key 'Service C' on the card at the next utilization. An Access key 'Service B' is obtained not from this SAM unit but from a SAM unit having SAM_ID of '43.13.137.XX'. As a mutual authentication key between SAM units, a key of 'SS1 . . . SSn' is used.

A determination flag specified by the other SAM unit determines whether or not the access key 'Service B' can be held till the next utilization.

'Service B Log' points to a file for storing log data to which SAM_ID of '43.13.137.XX' is assigned. Since the 'Service B Log' has the same SAM net mask as the 'Service B', as a mutual authentication key, a key of 'SS1 . . . SSn' is used. For each mutual authentication key, an APP table is provided In this embodiment, permission of accesses to the 'Service B Log' and 'Service B' is prescribed by the APP table 301 of another SAM unit referred to by an AP management table of the other SAM unit.

FIG. 11 is an explanatory diagram showing the APP table 301_1. The APP tables 301_2, 301_3 have the same format as the APP table 301_1. As shown in FIG. 11, the APP table 301_1 includes an identification APE_ID, a READ flag, a WRITE flag and an EXECUTE flag, which are provided for each application element APE. APE_ID is the identification of the application element APE. The READ flag indicates whether another application program (or another application element APE) has a read access to the application element APE. The WRITE flag indicates whether another application program (or another application element APE) has a write access to the application element APE. The EXECUTE flag indicates whether another application program (or another application element APE) has an execute access to the application element APE.

For example, the APP table 301_1 shown in FIG. 11 indicates that another application program (or another application element APE) has a read access and a write access but no execute (delete) access to the 'Service B log'.

In addition, the AP management storage area 221 of the external memory 7 shown in FIG. 5 is used for storing typically AP selection data by associating the AP selection data with an IC card type and AP_ID.

The IC card type is the type of the IC card 3 shown in FIG. 1. An example of the IC card type is an identification of a credit-card company having transaction settlement businesses using the IC card 3.

In this embodiment, the names APE_N of a plurality of application elements APE in an IC card operation macro-command script program are combined to prescribe a service, and the prescription of the service is reflected in an IC card entity (job management data) to be described later. Thus, a combination of services corresponding to the application elements APE can be rendered as the prescribed service.

For example, a service to read out data from the IC card 3 is combined with a service to write data into the server 2 to provide a combined service, which can be defined in an IC card entity.

In addition, APE_N or a service number is an operation command that is issued to the IC card 3 and can be interpreted by the IC card 3 when a service rendered by the service-rendering enterprise 15_1, 15_2 or 15_3 is processed.

The application program AP_1 is prescribed by the IC card operation macro-command script program and the AP management table 300_1 stored in the external memory 7.

By the same token, the application program AP_2 is prescribed the IC card operation macro-command script program and the AP management table 300_2 stored in the external memory 7.

In the same way, the application program AP_3 is prescribed by the IC card operation macro-command script program and the AP management table 300_3 stored in the external memory 7.

[SAM Module 8]

The SAM module 8 is connected to the ASP server 19 through the SCSI or the Ethernet. The ASP server 19 is connected to a plurality of terminals including the personal computer 5 of the end user and the personal computers 16_1, 16_2 and 16_3 of the service-rendering enterprises 15_1, 15_2 and 15_3 respectively through the Internet 10.

The personal computer 5 is connected to a Dumb-type card reader/writer 4 by a serial or USB cable. Between the card reader/writer 4 and the IC card 3, typically, radio communication corresponding to a physical level is implemented.

An operation command given to the IC card 3 is generated by the SAM unit 9. On the other hand, a response packet generated by the IC card 3 is interpreted by the SAM Unit 9. Thus, the card reader/writer 4, the personal computer 5 and the ASP server 19 interposed between the IC card 3 and the SAM unit 9 merely play the role of relaying the command and the response by storing them in a data payload unit. That is to say, the card reader/writer 4, the personal computer 5 and the ASP server 19 do not take part in operations such as encryption and decryption of data in the IC card 3 and authentication.

The personal computers 16_1, 16_2 and 16_3 allow their respective application programs AP_1, AP_2 and AP_3 to be customized by downloading a script program to be described later into the SAM module 8.

Figure 12:
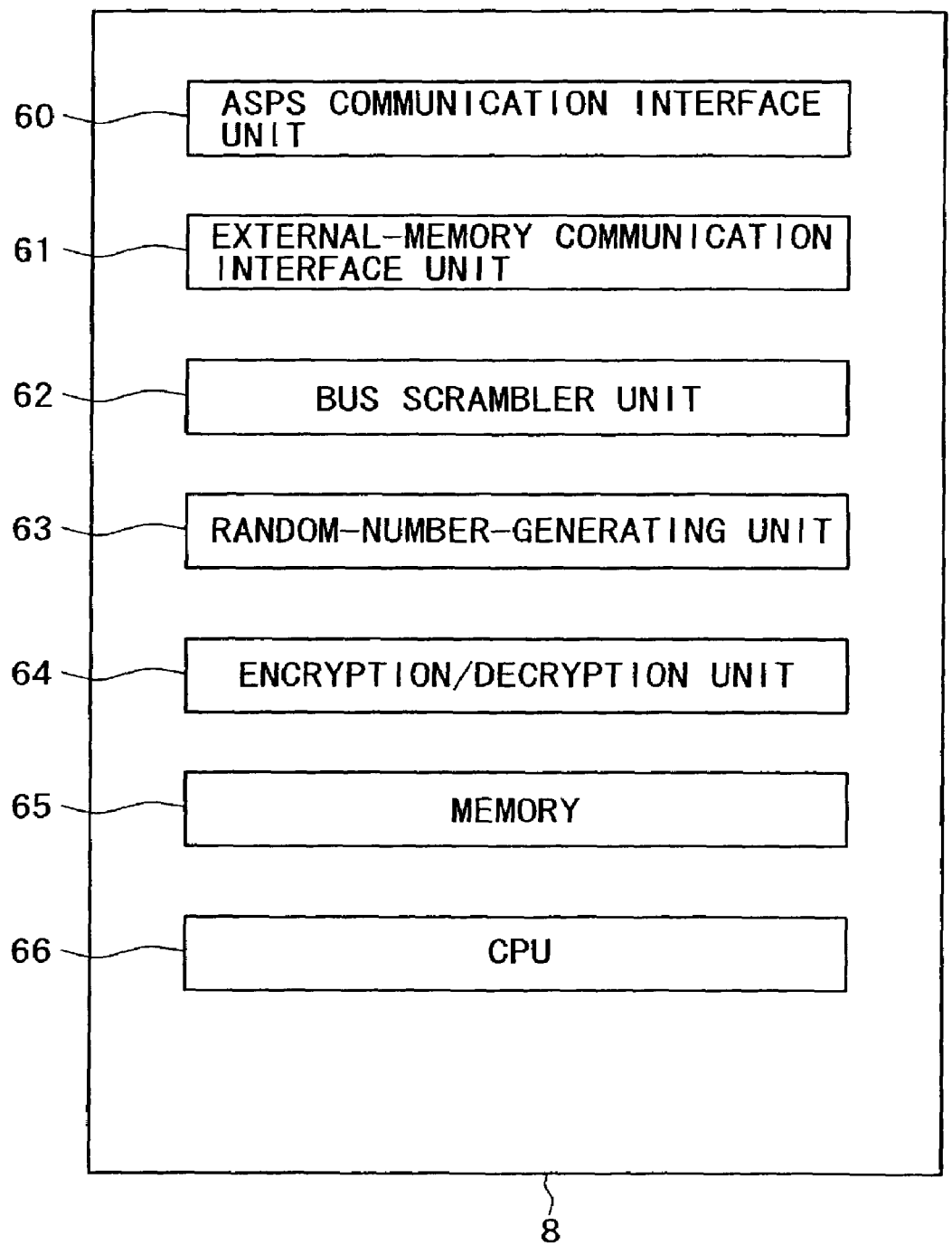
FIG. 12 is a functional block diagram showing the SAM module used in the communication system shown in FIG. 1.

FIG. 12 is a functional block diagram showing the SAM module 8 of the communication system shown in FIG. 1. As shown in FIG. 12, the SAM module 8 comprises an ASPS communication interface unit 60 (an interface provided by the present invention), an external-memory communication interface unit 61, a bus scrambler unit 62, a random-number-generating unit 63, an encryption/decryption unit 64, a memory 65 and a CPU 66 (a control means provided by the present invention).

The SAM module 8 is a tamper-withstanding module.

The ASPS communication interface unit 60 is an interface for exchanging data with the ASP server 19 shown in FIG. 1.

The external-memory communication interface unit 61 is an interface for exchanging data with the external memory 7.

The bus scrambler unit 62 scrambles data to be output and de-scrambles input data in an operation to exchange the data through the external-memory communication interface unit 61.

The random-number-generating unit 63 generates a random number used in authentication.

The encryption/decryption unit 64 encrypts data and decrypts encrypted data.

The memory 65 is used for storing tasks and programs, which are executed by the CPU 66, and data used in the execution of the tasks and the programs as will be described later.

The CPU 66 executes tasks such as a script download task, a script interpretation task, an entity generation task (a job management data creation task) and an IC-card procedure management task. These tasks will be described later.

The CPU 66 also carries out communication processing using command packet and response packets to be described later by execution of a program (a program provided by the present invention) electronically read out from the memory 65.

In addition, the CPU 66 carries out processing prescribed in the SAM unit 9 on the basis of an operation command in the SAM unit 9, and controls processing of the IC module 3a employed in the IC card 3 and the IC module 42 employed in the portable communication apparatus 41 on the basis of operation commands of the IC module 3a and the IC module 42.

The following description explains the tasks, the programs and the data, which are stored in the memory 65.

Figure 13:
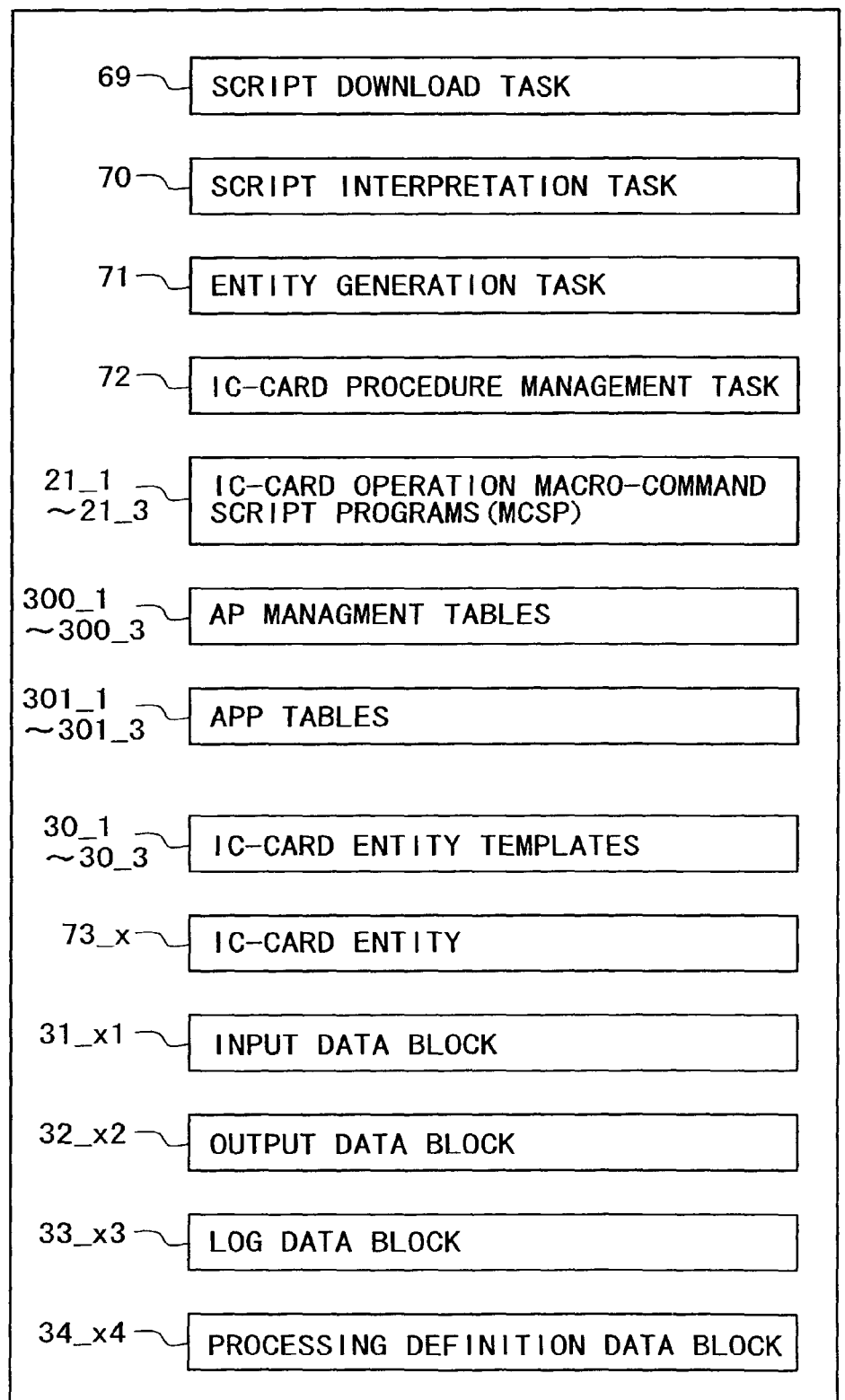
FIG. 13 is an explanatory diagram showing tasks, programs and the data, which are stored in a memory employed in the SAM module shown in FIG. 12.

FIG. 13 is an explanatory diagram showing the tasks, the programs and the data, which are stored in the memory 65. As shown in FIG. 13, the memory 65 is used for storing the aforementioned script download task 69, the aforementioned script interpretation task 70, the aforementioned entity generation task 71, the aforementioned IC-card procedure management task 72, IC-card operation macro-command script programs 21_1 to 21_3, the AP management tables 300_1 to 300_3, the APP tables 301_1 to 301_3, IC-card entity templates 30_1 to 30_3, an IC-card entity 73_x, an input data block 31_x1, an output data block 32_x2, a log data block 33_x3 and a processing definition data block 34_x4.

As shown in FIG. 8, the script download task 69 downloads the AP management tables 300_1 to 300_3 and, if necessary, the APP tables 301_1 to 301_3 from typically a computer owned by each service-rendering enterprise into the SAM module 8.

The script interpretation task 70 generates an IC-card entity template 30, an input data block 31_x1, an output data block 32_x2, a log data block 33_x3 and a processing definition data block 34_x4 for each service-rendering enterprise by using a service definition table, a script program and, if necessary, the APP tables 301_1 to 301_3 for each service-rendering enterprise.

The number of data blocks generated for each service-rendering enterprise is not specially determined.

When receiving a request for creation of an entity from typically the ASP server 19, the entity generation task 71 conducts polling with the IC card 3 and, then, by using an IC card entity template for a service-rendering enterprise, generates an IC card entity to be used in procedural processing between the IC card 3 and the service-rendering enterprise. In this process to create an entity, the IC card entity template is used as a class and the IC card entity is created as an instance of the class.

Processing carried out by the entity generation task 71 to generate an IC card entity will be described in detail later.

The IC-card procedure management task 72 carries out the procedural processing between the IC card 3 and the service-rendering enterprises 15_1 to 15_3 by using an IC card entity 73_x or a plurality of IC card entities 73_x existing in the memory 65. In this embodiment, a plurality of procedural processes between a plurality of IC cards 3 and the service-rendering enterprises 15_1 to 15_3 are carried out at the same time. That is to say, the IC-card procedure management task 72 carries out these procedural processes concurrently. The IC-card procedure management task 72 deletes IC card entities 73_x already used in such processes. Processing carried by the IC-card procedure management task 72 will be described later in detail.

The IC-card operation macro-command script programs 21_1 to 21_3 are obtained by the script download task 69 from typically the external memory 7 and stored in the memory 65.

By the same token, the AP management tables 300_1 to 300_3 are obtained by the script download task 69 from typically the external memory 7 and stored in the memory 65.

In the same way, the APP tables 301_1 to 301_3 are obtained by the script download task 69 from typically the external memory 7 and stored in the memory 65.

The IC card entity templates 30_1 to 30_3 are generated by the script interpretation task 70 and will each be used as a template (class) for generating an IC card entity 73_x of a procedure for a service-rendering enterprise. By using the IC card entity templates 30_1 to 30_3 as typically classes, the entity generation task 71 generates an IC card entity 73_x as a class instance.

As described earlier, the script interpretation task 70 generates an input data block 31_x1, an output data block 32_x2, a log data block 33_x3 and a processing definition data block 34_x4.

Next, the IC card entity 73_x is explained. When the SAM module 8 receives a request for processing using the IC card 3 and the application program of a predetermined service-rendering enterprise from the ASP server 19, for example, the entity generation task 71 in the SAM module 8 generates an IC card entity 73_x by using an already generated IC card entity template of the service-rendering enterprise.

Figure 14:
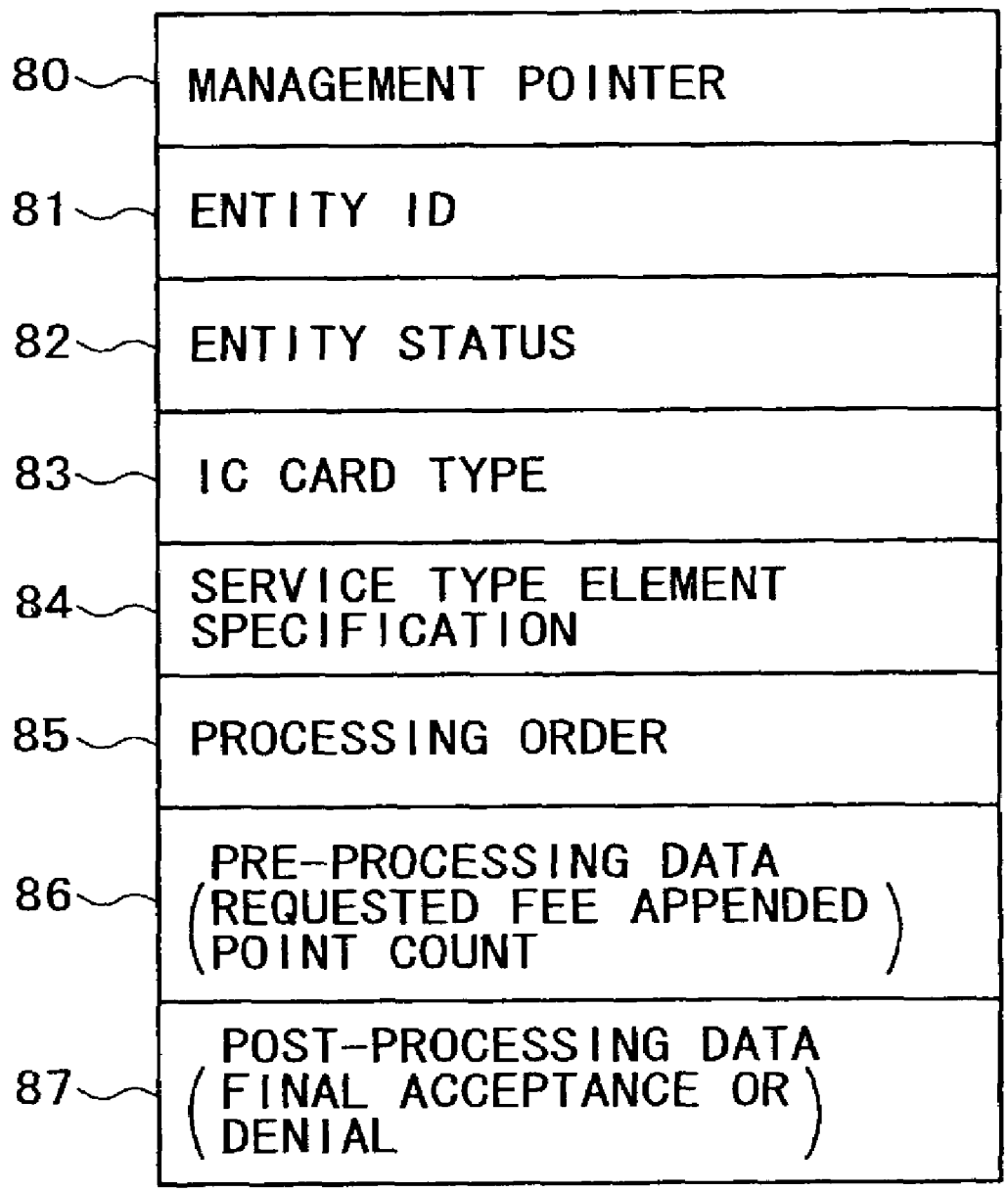
FIG. 14 is an explanatory diagram showing the format of an IC card entity.

FIG. 14 is an explanatory diagram showing the format of the IC card entity 73_x. As shown in FIG. 14, the IC card entity 73_x comprises a management pointer 80, an entity ID

81, entity status 82, an IC card type 83, an APE_N specification 84, a processing order 85, preprocessing data 86 and post-processing data 87. The entity status 82 is status of progress of a procedure related to the IC card 3. The IC card type 83 is data for identifying a service-rendering enterprise issuing the IC card 3. The APE_N specification 84 specifies an APE to be utilized in processing using an IC card identity 73_x. The processing order 85 is an order in which services (that is, jobs) are to be executed. The post-processing data 87 is a result of processing.

Figure 15:
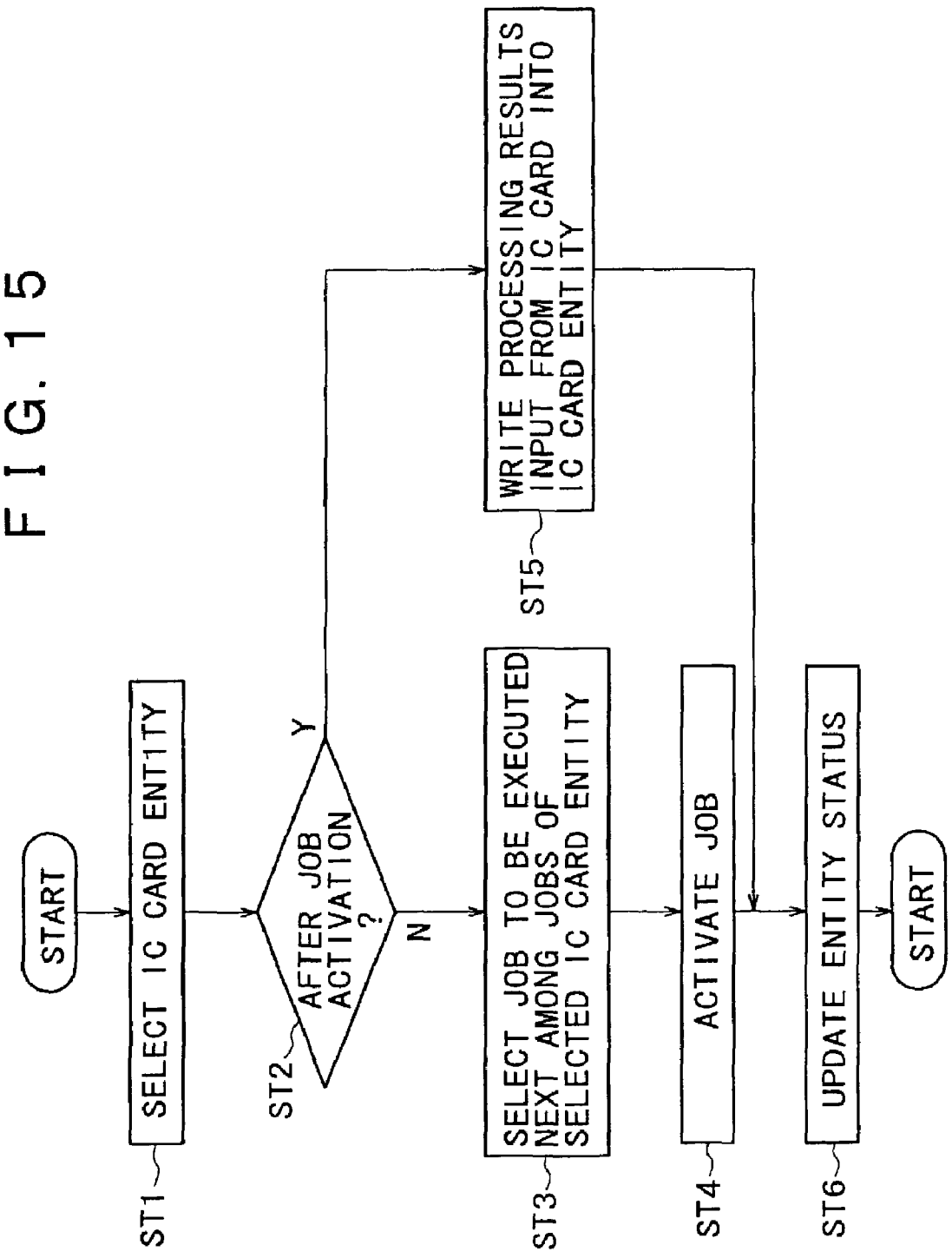
FIG. 15 shows a flowchart representing processing carried out by an IC card procedure management task.

The following description explains a procedure of processes related to a plurality of IC cards 3. The procedure is executed by the IC card procedure management task 72 shown in FIG. 13 by using a plurality of IC card entities 73_x. The IC card procedure management task 72 is running all the time typically on the CPU 66 employed in the SAM module 8 shown in FIG. 12. FIG. 15 shows a flowchart representing processing carried out by IC card procedure management task 72.

Step ST1

The IC card procedure management task 72 selects one of a plurality of IC card entities 73_x existing in the memory 65. Processing related to the selected IC card entity 73_x is to be carried out next. As a method of selecting an IC card entity 73_x, an IC card entity 73_x may be selected according to an order in which the IC card entities 73_x are arranged in the memory 65. As an alternative, a priority level may be assigned to each of the IC card entities 73_x and an IC card entity 73_x may be selected on a priority basis.

Step ST2

The IC card procedure management task 72 forms a judgment as to whether or not the job of the IC card entity 73_x selected at the step ST1 has already been activated. If an outcome of the judgment indicates that the job of the IC card entity 73_x selected at the step ST1 has already been activated, the procedure goes on to processing of a step ST5. If an outcome of the judgment indicates that the job of the IC card entity 73_x selected at the step ST1 has not been activated, on the other hand, the procedure goes on to processing of a step ST3.

Step ST3

The IC card procedure management task 72 identifies a state of processing related to the IC card entity 73_x selected at the step ST1 among states in a state transition diagram from the entity status 82 shown in FIG. 14, and determines a job to be carried out next from the processing order 85. As described earlier, the processing order 85 prescribes an execution sequence of jobs expressed in terms of service elements set in the AP management tables 300_1 to 300_3.

Step ST4

The IC card procedure management task 72 activates the job selected at the step ST3. Then, the IC card procedure management task 72 carries out the job by using a data block related to this job. The data block related to this job is selected among the input data block 31_x1, the output data block 32_x2, the log data block 33_x3 and the processing definition data block 34_x4, which have been explained earlier by referring to FIG. 8.

At that time, if a command is issued to the IC card 3 in execution of the job, the IC card procedure management task 72 searches the AP management tables 300_1 to 300_3 by using a service element for the job as a key for a service number of the service element. The service number is an operation command, which is issued to the IC card 3 and can be interpreted by the IC card 3. Then, the IC card procedure management task 72 issues the command by using the service number to the IC card 3. In addition, if a key is required in making an access to the storage area of the IC module 3a, the IC card procedure management task 72 searches the AP management tables 300_1 to 300_3 by using a service element for the job as a key for a service number assigned to the service element. Then, the IC card procedure management task 72 carries out processing by using the key in order to acquire a right to make an access to the storage area of the IC card 3. The processing includes mutual authentication with respect to the IC card 3, encryption of data and decryption of data.

Step ST5

The IC card procedure management task 72 issues a command to the IC card 3. Then, at a step ST5, the IC card procedure management task 72 waits for a result of processing carried out by the IC card 3 to process the command. As the IC card procedure management task 72 receives the result of processing from the IC card 3, the IC card procedure management task 72 sets the result in the IC card entity 73_x.

Step ST6

The IC card procedure management task 72 updates the entity status 82 of the IC card entity 73_x. The entity status 82 of the IC card entity 73_x is shown in FIG. 14.

As described above, in this embodiment, while selecting IC card entities 73_x of a plurality of IC cards 3 existing in the SAM module 8 sequentially one after another in accordance with a predetermined order, the IC card procedure management task 72 carries out processing on the IC cards 3 concurrently. Thus, even when a processing request for a procedure using a plurality of IC cards 3 is received, the SAM module 8 is capable of carrying forward the processing at the same time.

In addition, when data is exchanged between the SAM module 8 and the IC card 3 in accordance with a procedure set by an application element APE in the execution of a job at the step ST4 of the flowchart shown in FIG. 15, the SAM module 8 searches the AP management tables 300_1 to 300_3 shown in FIG. 11 for a key K_CARD for the application element APE and uses a key K_CARD to make an access to the memory 50.

[Server 19]

Figure 16:
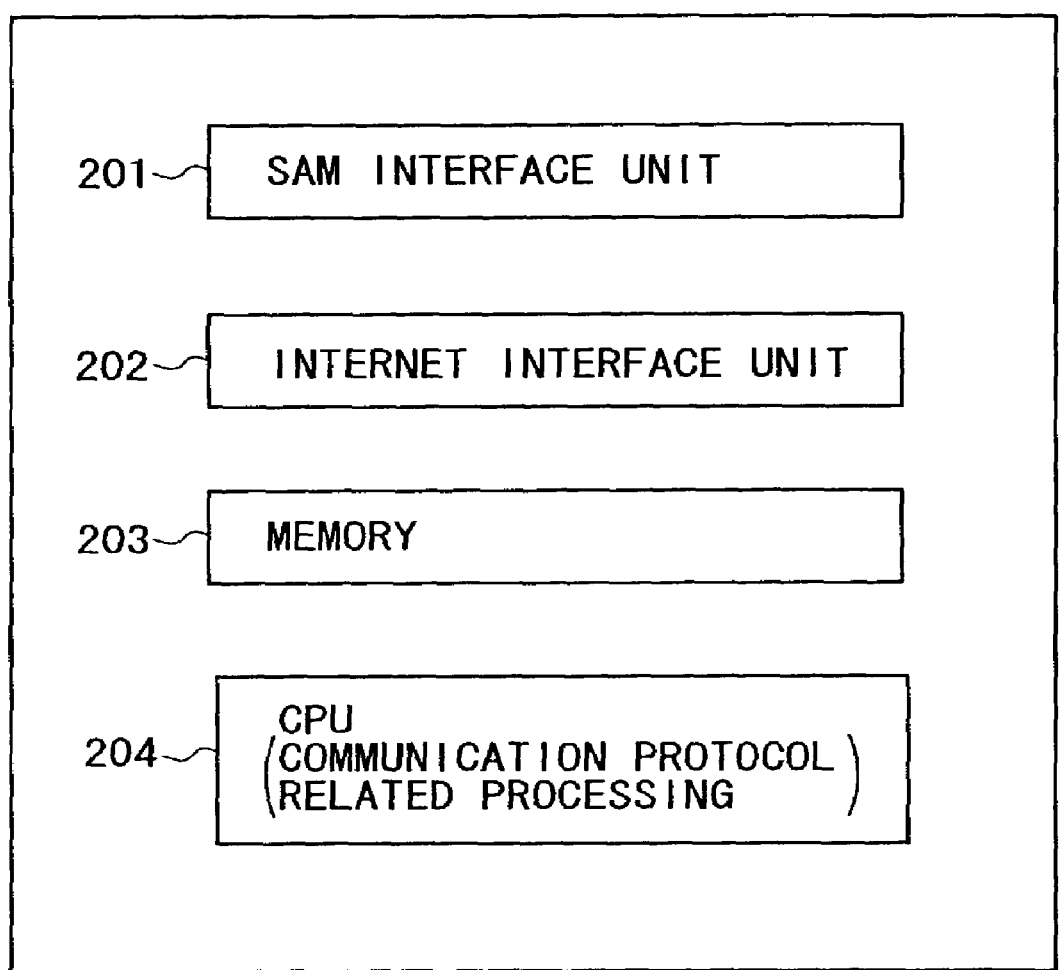
FIG. 16 is a functional block diagram showing an APS server used in the communication system shown in FIG. 1.

FIG. 16 is a functional block diagram showing the ASP server 19 used in the communication system shown in FIG. 1. As shown in FIG. 16, the ASP server 19 typically comprises a SAM interface unit 201, an Internet interface unit 202, a memory 203 and a CPU 204.

Figure 17:
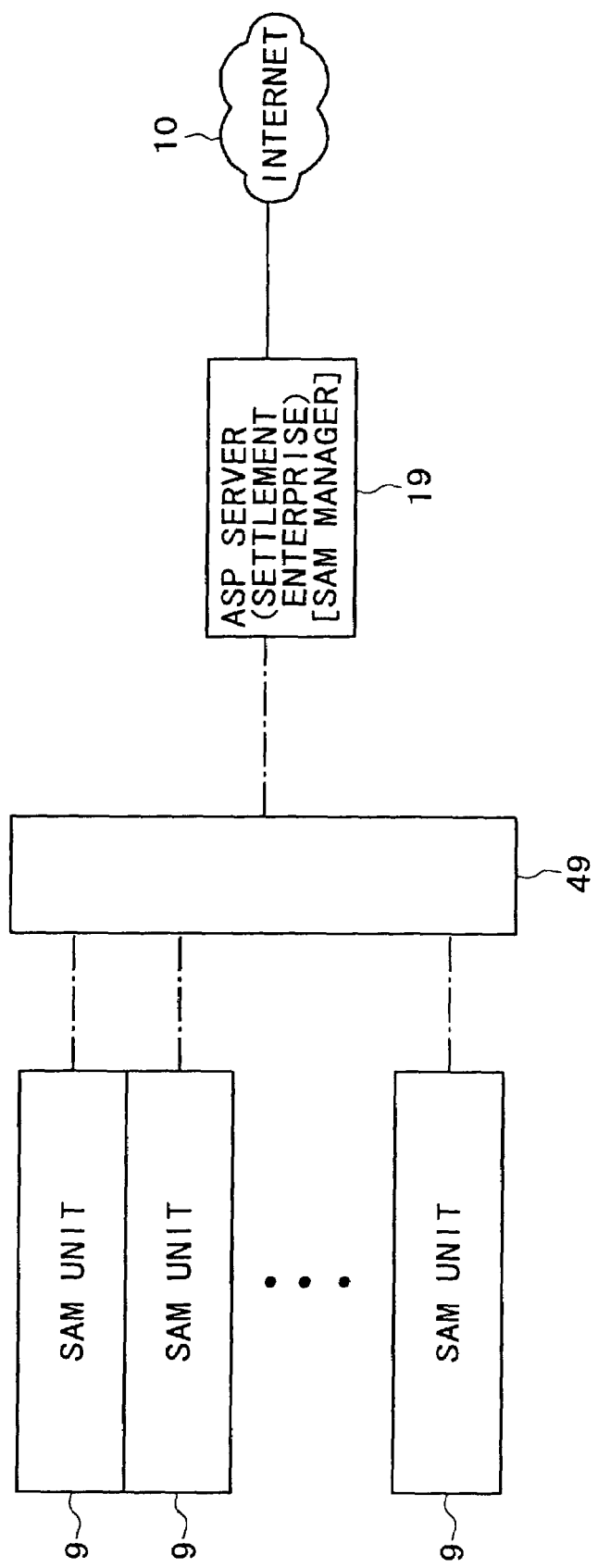
FIG. 17 is an explanatory diagram showing communication between SAM units and the ASP server through a load balancer.

The SAM interface unit 201 exchanges data with a plurality of SAM modules 8 shown in FIG. 1 through a load balancer 49 shown in FIG. 17 on the basis of a communication protocol to be described later. For the plurality of SAM units 9 connected to the ASP server 19, the load balancer 49 has a function to properly distribute processing related to the same IC module among the SAM units 9 so that the processing can be carried out by the SAM units 9 in a distributed-processing way.

The Internet interface unit 202 exchanges data with the server 2, the personal computer 5, the personal computers 15_1, 15_2 and 15_3 as well as the portable communication apparatus 41 through the Internet 10 shown in FIG. 1 on the basis of a communication protocol to be described later.

The memory 203 is used for storing programs to be executed by the CPU 204 in order to carry out various kinds of processing and data used in the processing.

An example of the processing carried out by the CPU 204 is processing to implement a communication protocol to be described later by execution of a program stored in the memory 203.

[Basic Communication Protocol]

The following description explains fundamentals of a communication protocol used in communications among the SAM module 8, the ASP server 19, the IC module 42 and the IC module of the IC card 3.

Figure 18:
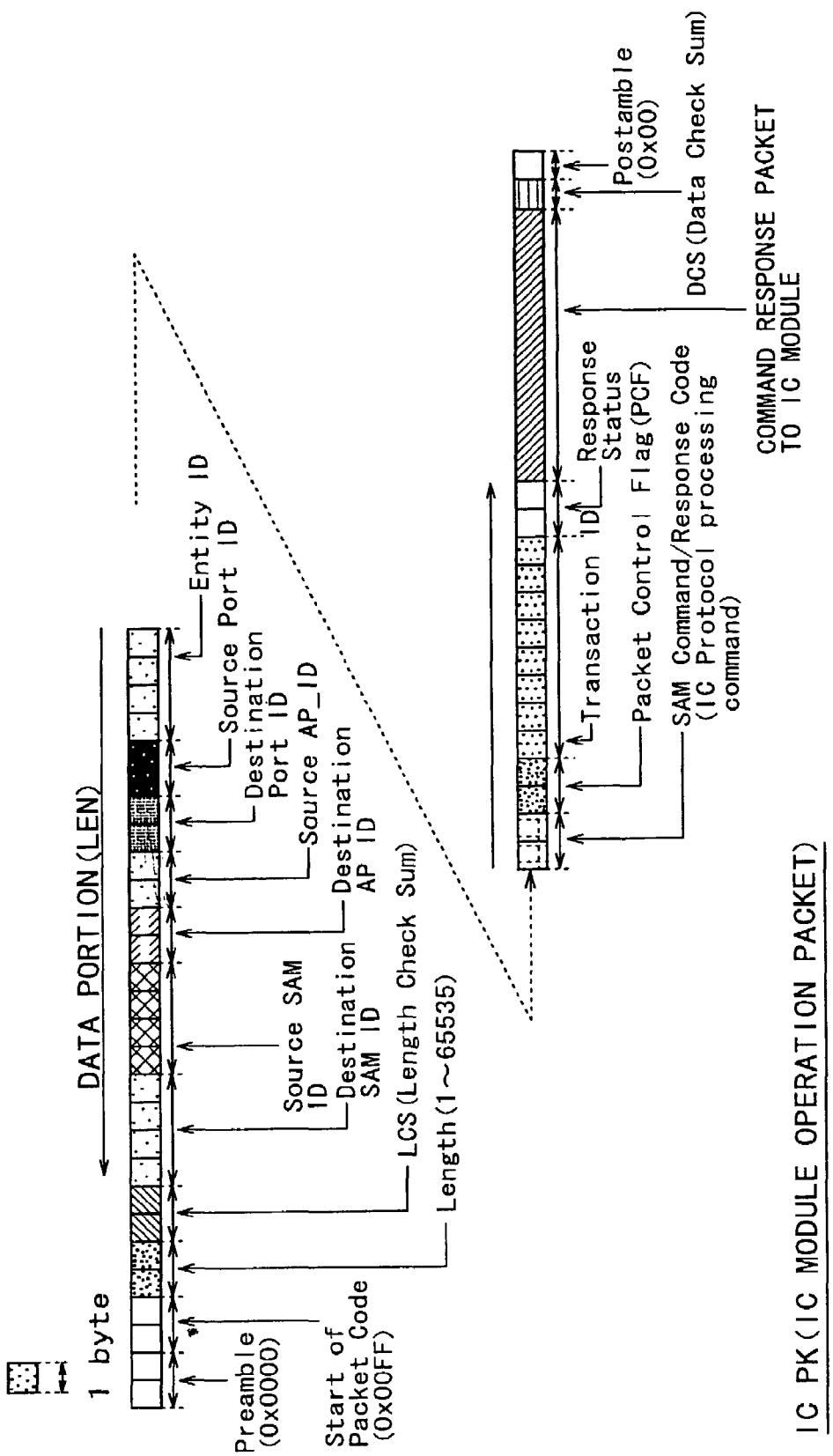
FIG. 18 is an explanatory diagram showing a packet used as a command packet or response packet prescribing processing of an IC module.
Figure 19:
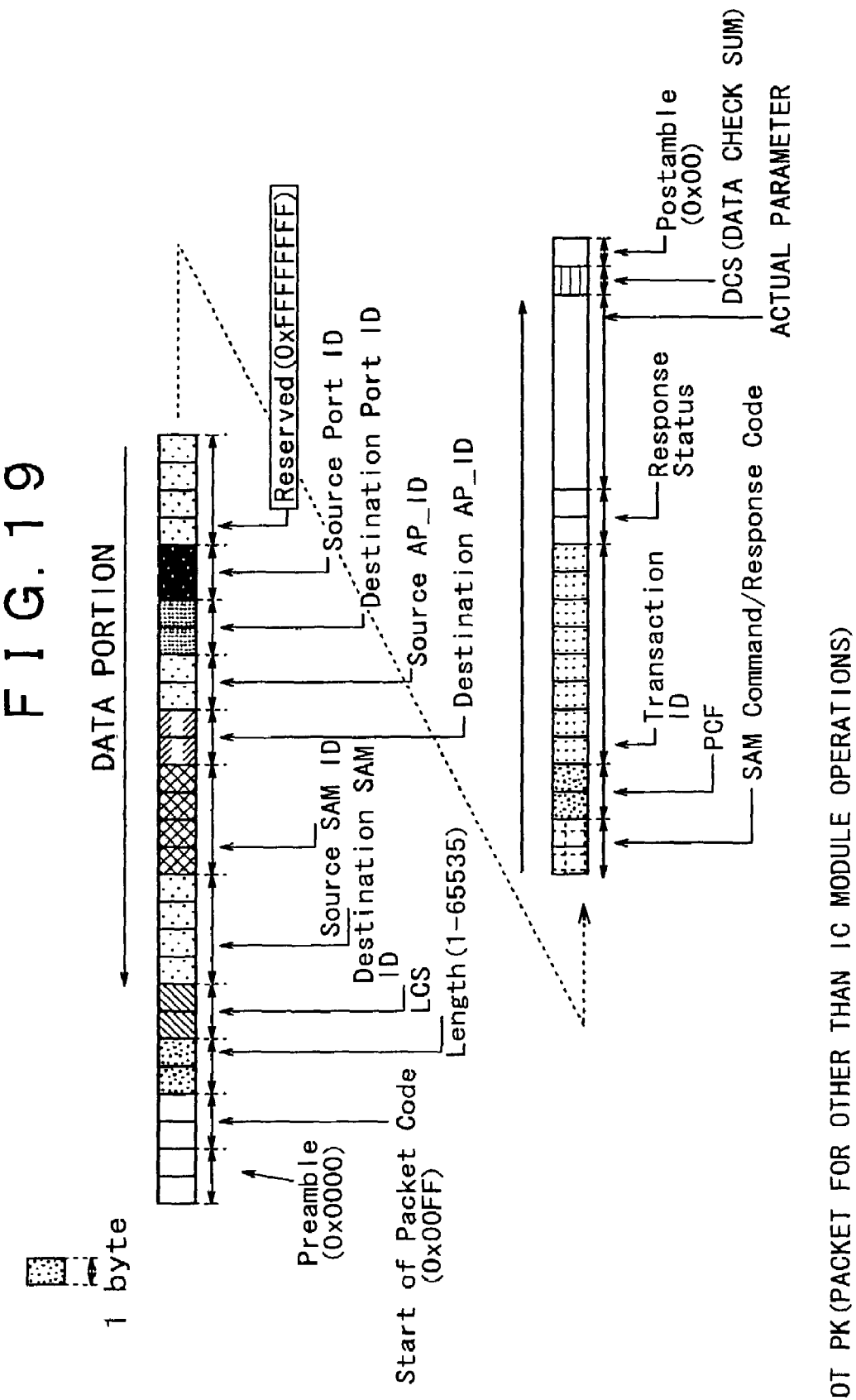
FIG. 19 is an explanatory diagram showing a packet used as a command packet or response packet prescribing processing other than the processing of the IC module.

A packet used in the communication protocol can be a packet IC_PK prescribing processing of the IC module as shown in FIG. 18 or another packet OT_PK shown in FIG. 19. As shown in FIG. 18, the packet IC_PK includes the entity ID of an IC entity explained earlier by referring to FIG. 14. The entity ID of an IC entity is prescribed for each processing relevant to IC module in the SAM module 8. On the other hand, the other packet OT_PK does not include such an entity ID as shown in FIG. 19. Otherwise, both the packets IC_PK and OT_PK have the same format.

Figure 20:
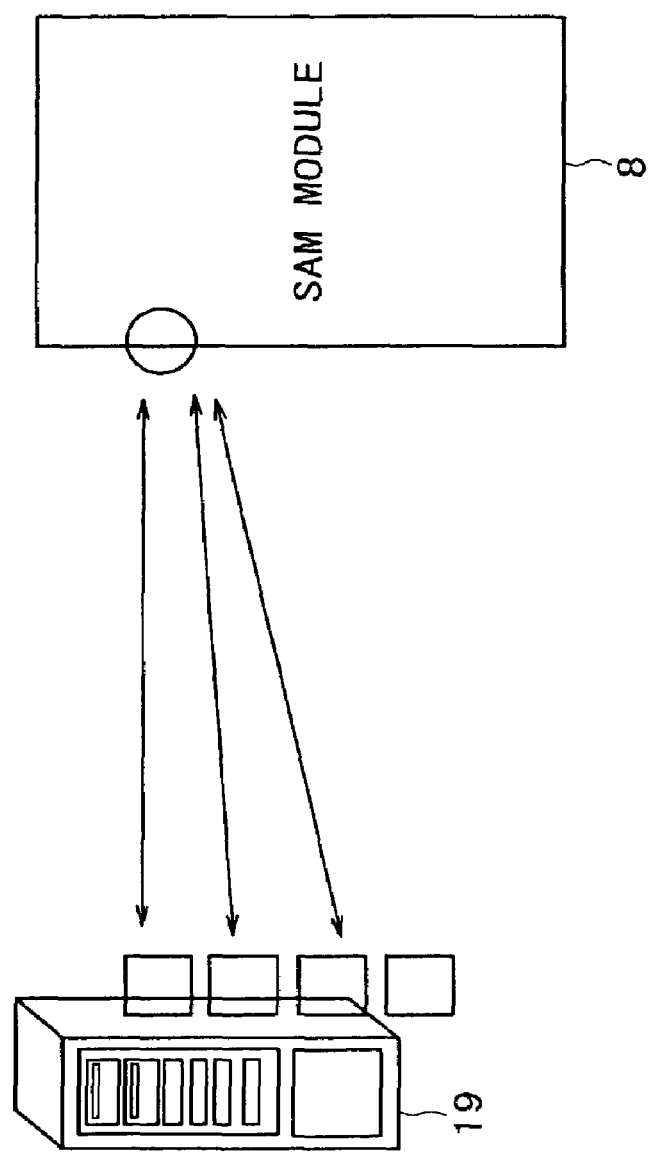
FIG. 20 is an explanatory diagram showing fixed connections between the SAM module and the server.
Figure 21:
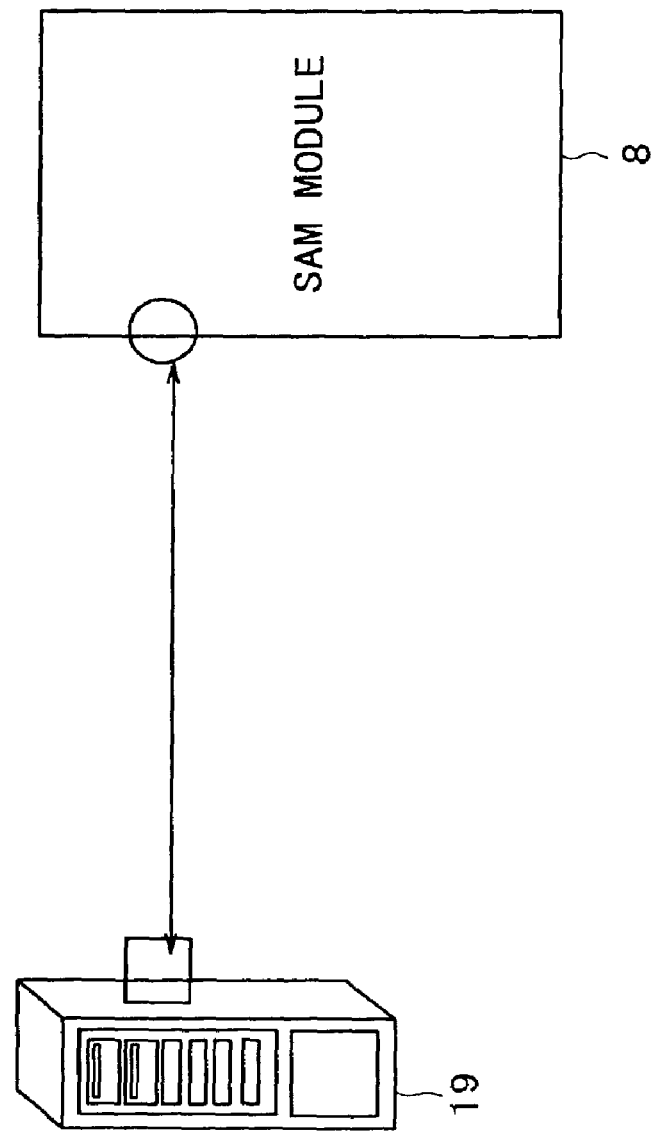
FIG. 21 is an explanatory diagram showing a movable connection between the SAM module and the server.

As shown in FIG. 20, command and response packets having the OT_PK format are transferred using a communication line of a fixed connection established permanently between the SAM module 8 and the ASP server 19. On the other hand, command and response packets having the IC_PK format are transferred using a communication line of a temporary connection established temporarily between the SAM module 8 and the ASP server 19 as shown in FIG. 21. A temporary connection is established between the SAM module 8 and the ASP server 19 with a timing, with which the ASP server 19 requests the SAM unit 9 to carry out processing related to the IC module, on a temporary basis. That is to say, the temporary connection is deleted after the command and response packets are transferred. Thus, a communication line is set on the temporary connection when the ASP server 19 requests the SAM unit 9 to carry out processing related to the IC module.

It is to be noted that, typically, connections for communications between the SAM unit 9 and the ASP server 19 are managed by the ASP server 19, the SAM unit 9 or the load balancer 49. In addition, the number of IC-module processes that can be carried out at the same time is specified for each application program AP.

The formats of the packets described above are explained as follows.

As shown in FIG. 18, the packet IC_PK comprises a preamble provided at the head of the packet to be followed by successive fields named Start of Packet Code, Length, LCS (Length Check Sum), Destination SAM_ID, Source SAM_ID, Destination AP_ID, Source AP_ID, Destination Port_ID, Source Port_ID, Entity ID, SAM Command/Respond Code, PCF (Packet Control Flag), Transaction ID, Response Status, a command or response packet transmitted to the IC-module, DCS (Data Check Sum) and Postamble at the tail of the packet. Start of Packet Code is a code indicating the start of the packet. Length is the length of the packet. LCS is the length of the check sum. Destination SAM_ID is the identification of a SAM unit 9 serving as the destination of the transmission of the packet. Source SAM_ID is the identification of a SAM unit 9 serving as the source of the transmission of the packet. Destination AP_ID is the identification of an application program AP at the destination of the transmission of the packet. Source AP_ID is the identification of an application program at the source of the transmission of the packet. Destination Port ID is the identification of a port at the destination of the transmission of the packet. Source Port ID is the identification of a port at the source of the transmission of the packet. Entity ID is the identification of an IC entity. DCS is the check sum of the data portion.

It is to be noted that SAM_ID agreed on for the operation is assigned to the ASP server 19. An example of such SAM_ID is all 'F'.

Port ID is used for the purpose of apportioning processing in the application program AP.

The command/response code is the contents of respectively a command and a response exchanged between the ASP server 19 and the SAM unit 9.

Figure 22:
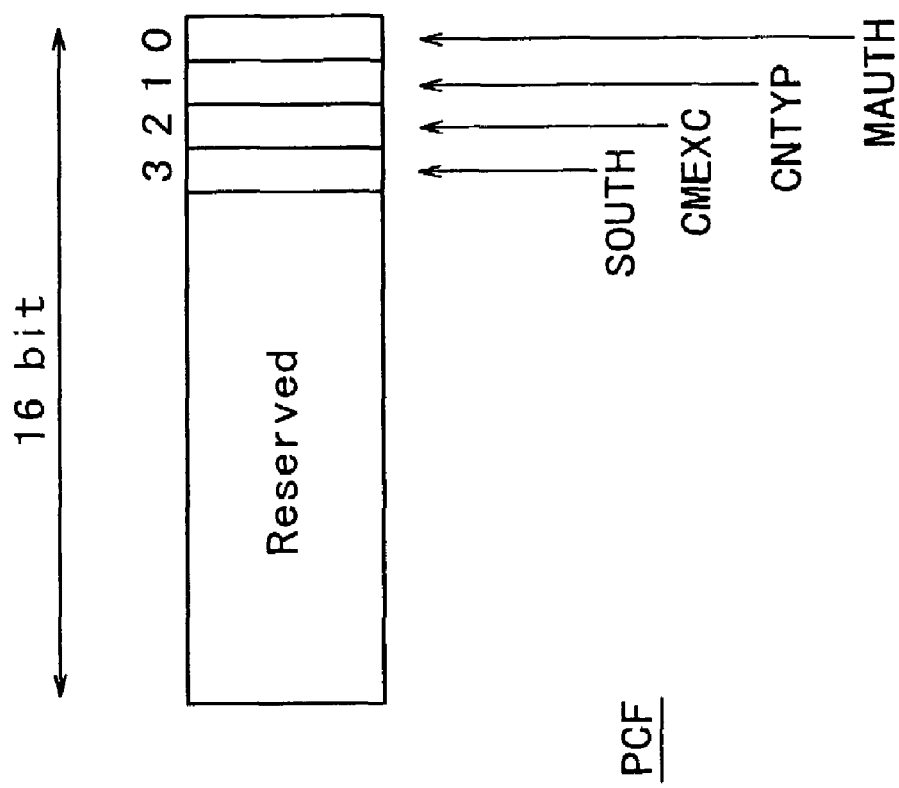
FIG. 22 is an explanatory diagram showing a flag PCF included in the packets shown in FIGS. 18 and 19.

FIG. 22 is an explanatory diagram showing details of the flag PCF included in the packets shown in FIGS. 18 and 19. As shown in FIG. 22, the flag PCF consists of 16 bits used for prescribing processing related to the packet or indicating attributes of the processing. To put it concretely, the flag PCF consists of only four effective bits, namely, 1-bit indicator flags named SOUTH, CMEXC, CNTYP and MAUTH (indicators provided by the present invention) respectively. The indicator flag SOUTH is a flag indicating whether or not mutual authentication is to be implemented between SAM units. The indicator flag CNTYP is a flag indicating that either a multi-command technique or a single-command technique is adopted. The multi-command technique is a technique for IC module operation commands taking the efficiency of execution into consideration. The multi-command technique and the single-command technique will be described later. The indicator flag CNTYP is a flag indicating whether the connection between the ASP server 19 and the SAM module 8 is the fixed connection or the temporary connection. The indicator flag MAUTH is a flag indicating whether or not mutual authentication between SAM unit 9 and the ASP server 19 is to be executed.

The packet OT_PK shown in FIG. 19 is different from the packet IC_PK shown in FIG. 18 in that the Entity ID field of the packet IC_PK is a reserved field in the packet OT_PK, and the packet-data field in the IC_PK packet is used for storing the actual command/response transmitted to the IC module while the packet-data field in the OT_PK packet is used for storing actual parameters.

Figure 23:
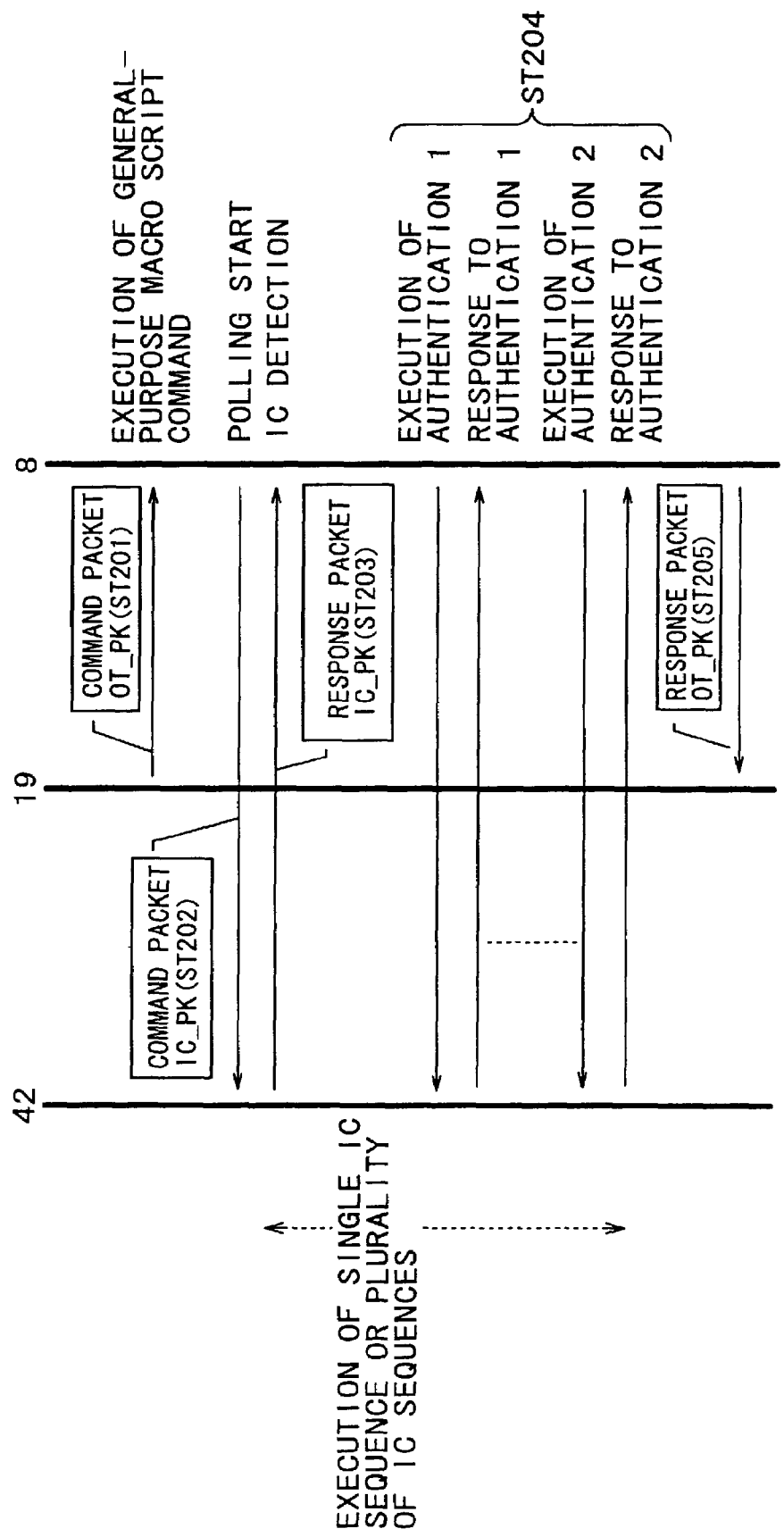
FIG. 23 is an explanatory diagram showing a procedure of communication using the packet IC_PK shown in FIG. 18 between the IC module and the SAM module in the communication system shown in FIG. 1.

The following description explains a procedure of carrying out a communication involving the IC module 42 by using a packet IC_PK shown in FIG. 18 in the communication system 1 shown in FIG. 1. FIG. 23 is an explanatory diagram showing this procedure.

Step ST201

The CPU 204 employed in the ASP server 19 shown in FIG. 16 creates a command packet (a first command according to the first to third aspects of the present invention) with the OT_PK format shown in FIG. 19 and outputs the command packet to the SAM module 8 by way of the SAM interface unit 201. The SAM module 8 receives the command packet from the ASP server 19 through the ASPS communication interface unit 60 shown in FIG. 12. The command packet includes an entity macro processing command 0×304 (a command according to the first to third aspects of the present invention) as the command code shown in FIG. 19. The entity macro processing command 0×304 is a command code prescribing an operation between the ASP server 19 and the SAM unit 9. The actual-parameter field is used for storing data specifying packet data for an IC-module processing command prescribing an operation for the IC module 42.

Step ST202

The CPU 66 employed in the SAM module 8 executes the entity macro processing command included in the OT_PK command packet received at the step ST201 and starts a polling operation. The CPU 66 then creates a command packet (a second command according to the first to third aspects of the present invention) having the IC_PK format shown in FIG. 18 on the basis of the packet data specified in the actual-parameter field of the OT_PK command packet to be used for an IC-module processing command. To be transmitted to the IC module 42, this IC_PK command packet is a packet including packet data 0×303 for an IC-module processing command as shown in FIG. 18. The IC_PK command packet is then transmitted from the ASPS communication interface unit 60 shown in FIG. 12 to the IC module 42 by way of the ASP server 19. In a field preceding the response-status field, the IC_PK command packet includes data to be used in the operation of the IC module 42.

Step ST203

The IC module 42 shown in FIG. 2 carries out processing based on the IC_PK command packet received at the step ST202, and stores a result of the processing in a response packet (a first response according to the first to third aspects of the present invention) generated with the IC_PK format shown in FIG. 18. Then, the IC module 42 transmits this response packet to the SAM module 8 by way of the ASP server 19. The response packet includes an IC module processing response 0×302 as the response code shown in FIG. 18. In a field preceding the response-status field of the response packet shown in FIG. 18, the response packet includes a response from the IC module 42.

Step ST204

The CPU 66 employed in the SAM module 8 carries out a mutual authentication with respect to the IC module 42. If mutual validities are authenticated, the flow of the procedure goes on to processing of a step ST205.

Step ST205

Assume that, on the basis of the IC_PK response packet received at the step ST203, the CPU 66 employed in the SAM module 8 shown in FIG. 12 determines that the processing specified by the OT_PK command packet received at the step ST201 has been completed. In this case, the CPU 66 creates a response packet (a second response according to the first to third aspects of the present invention) with the OT_PK format shown in FIG. 19 and transmits this OT_PK response packet to the ASP server 19. This OT_PK response packet includes a response 0×305 for IC module processing.

[Multi-Command Technique]

Figure 24:
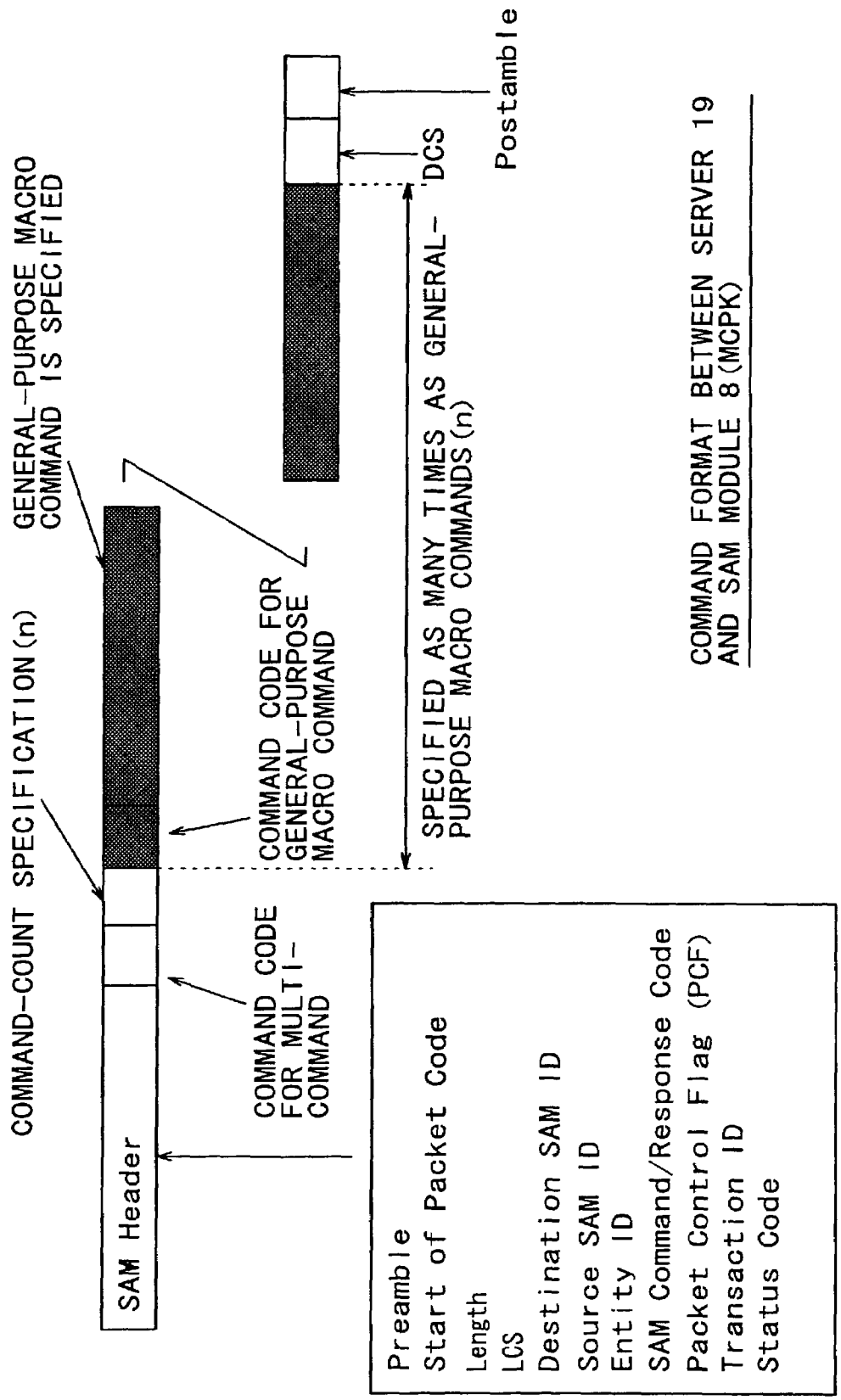
FIG. 24 is an explanatory diagram showing the format of a multi-command packet MCPK transferred between the server and the SAM module in the communication system shown in FIG. 1.

The following description explains the format of each packet for a multi-command technique. FIG. 24 is an explanatory diagram showing the format of a multi-command packet MCPK transferred between the ASP server 19 and the SAM module 8. As shown in FIG. 24, the multi-command packet MCPK comprises a field named SAM Header at the head to be followed by successive fields used for storing a command code for multi-command, a command count, a plurality of command codes for general-purpose-macro-command and their parameters, a DCS (Data Check Sum) for a data portion and a postamble at the tail of the packet MCPK.

The command codes for general-purpose-macro-command and their parameters are enumerated in the multi-command packet MCPK in the order the commands represented by the command codes are to be executed. Typically, the maximum number of command codes for general-purpose-macro-command enumerated in the multi-command packet MCPK along with their parameters is 16.

As shown in FIG. 24, the SAM header includes fields named Preamble, Start of Packet Code, Length, LCS (Length Check Sum), Destination SAM_ID, Source SAM_ID, Entity ID, SAM Command/Response Code, PCF (Packet Control Flag), Transaction ID and Status Code respectively. Start of Packet Code is a code indicating the start of the command packet MCPK. Length is the length of the command packet MCPK. LCS is the length of the checksum. Destination SAM_ID is the ID of a SAM unit 9 serving as the destination of the transmission of the command packet MCPK. Source SAM_ID is the ID of a SAM unit 9 serving as the source of the transmission of the command packet MCPK. Entity ID is the ID of the IC entity.

The field PCF includes the flag CNTYP shown in FIG. 22. The flag CNTYP indicates a temporary connection in this case.

The command for the entity macro processing prescribing an operation to be carried out by the IC module 42 is specified as a command code.

Figure 25:
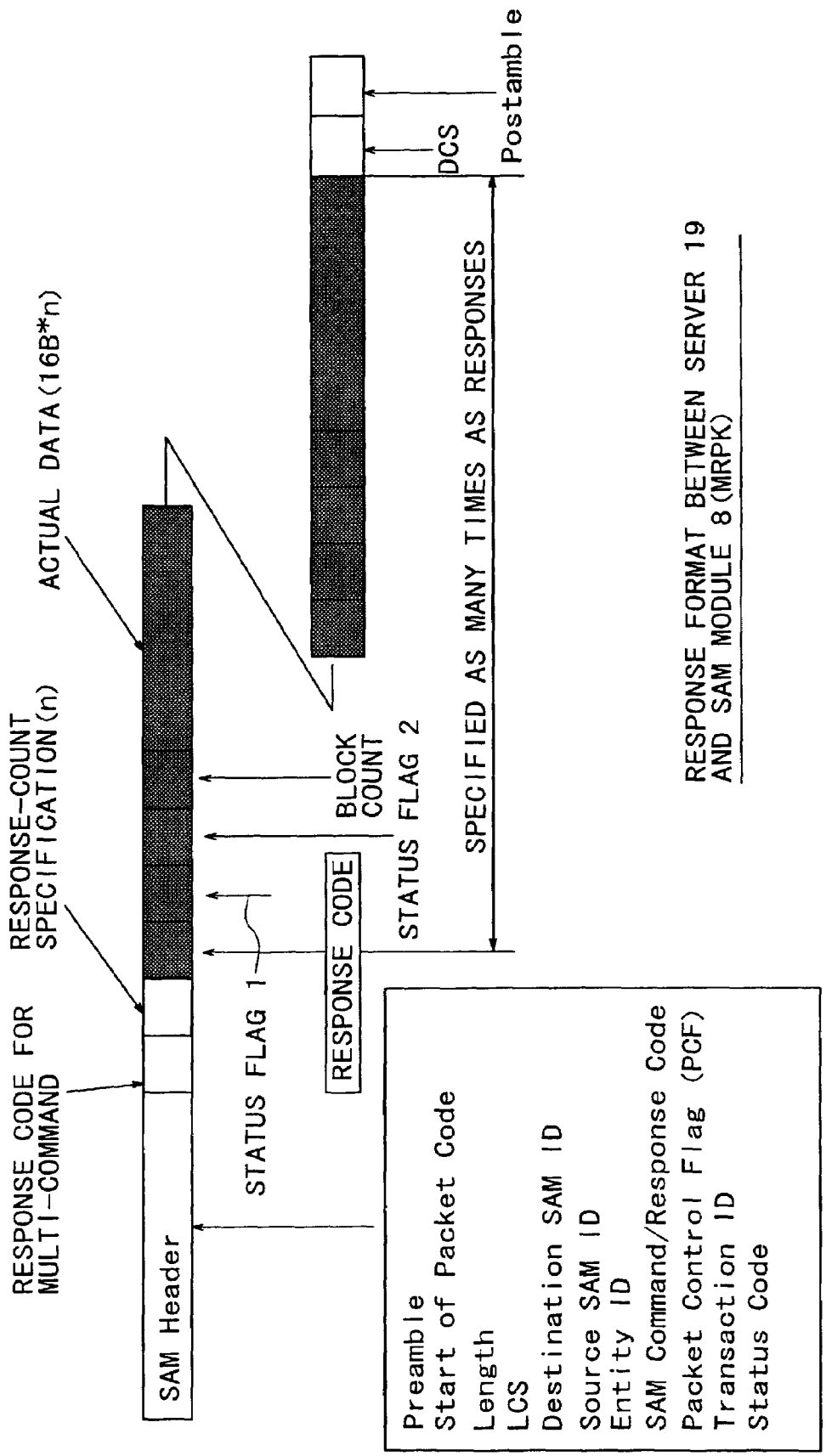
FIG. 25 is an explanatory diagram showing the format of a multi-response packet MRPK transferred between the server and the SAM module in the communication system shown in FIG. 1.

FIG. 25 is an explanatory diagram showing the format of a multi-response packet MRPK transferred between the ASP server 19 and the SAM module 8. As shown in FIG. 25, the multi-response packet MRPK comprises a field named SAM Header at the head to be followed by successive fields used for storing a multi-response command code, a response count, a response code, response flag 1, response flag 2, a block count, actual data, a DCS (Data Check Sum) for a data portion and a postamble at the tail of the packet MRPK. In actuality, the format shown in FIG. 25 includes as many response codes, as many response flags 1, as many response flags 2, as many block counts and as many pieces of actual data as responses included in the response packet MRPK.

Typically, the maximum number of the fields of the module consisting of the response codes, response flags 1, response flags 2, block counts and pieces of actual data are each 16. It is to be noted that the response count is the sum total of the number of successful responses and the number of initially failing responses.

As shown in FIG. 25, the SAM header includes fields named Preamble, Start of Packet Code, Length, LCS (Length Check Sum), Destination SAM_ID, Source SAM_ID, Entity ID, SAM Command/Response Code, PCF (Packet Control Flag), Transaction ID and Status Code respectively. Start of Packet Code is a code indicating the start of the response packet MRPK. Length is the length of the response packet MRPK. LCS is the length of the checksum. Destination SAM_ID is the ID of a SAM unit 9 serving as the destination of the transmission of the response packet MRPK. Source SAM_ID is the ID of a SAM unit 9 serving as the source of the transmission of the response packet MRPK. Entity ID is the ID of the IC entity. The field PCF includes the flag CNTYP shown in FIG. 22.

Figure 26:
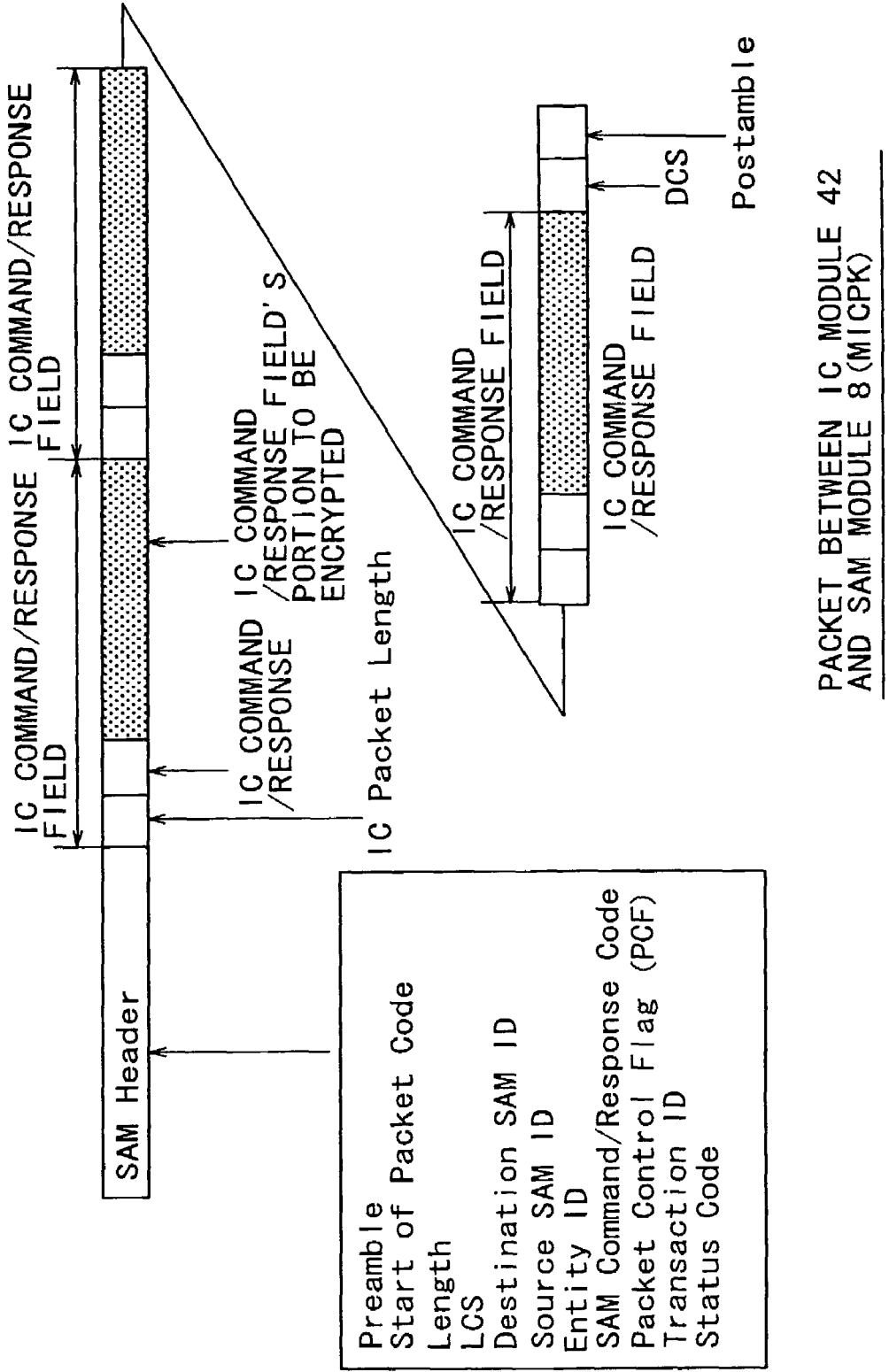
FIG. 26 is an explanatory diagram showing the format of a multi-command/response packet MICPK transferred between the IC module and the SAM module in the communication system shown in FIG. 1.

FIG. 26 is an explanatory diagram showing the format of a multi-command/response packet MICPK transferred between the IC module 42 and the SAM module 8. As shown in FIG. 26, the multi-command/response packet MICPK comprises a field named SAM Header at the head to be followed by successive fields used for storing a plurality of IC-module commands/responses, a DCS (Data Check Sum) for a data portion and a postamble at the tail of the packet MICPK.

Each of the IC-module commands/responses includes an IC packet length, a portion not to be encrypted and a portion to be encrypted.

As shown in FIG. 26, the SAM header includes fields named Preamble, Start of Packet Code, Length, LCS (Length Check Sum), Destination SAM_ID, Source SAM_ID, Entity ID, SAM Command/Response Code, PCF (Packet Control Flag), Transaction ID and Status Code respectively. Start of Packet Code is a code indicating the start of the multi-command/response packet MICPK. Length is the length of the multi-command/response packet MICPK. LCS is the length of the checksum. Destination SAM_ID is the ID of a SAM unit 9 serving as the destination of the transmission of the multi-command/response packet MICPK. Source SAM_ID is the ID of a SAM unit 9 serving as the source of the transmission of the multi-command/response packet MICPK. Entity ID is the ID of the IC entity.

SAM Command/Response Code included in the SAM header is an IC-module processing command/response code.

The following description explains communication techniques of a multi-command/response method using the packets shown in FIGS. 24, 25 and 26 in the communication system 1 shown in FIG. 1.

[First Communication Technique]

A first communication technique of the multi-command/response method is an embodiment according to fourth to sixth aspects of the present invention.

Figure 27:
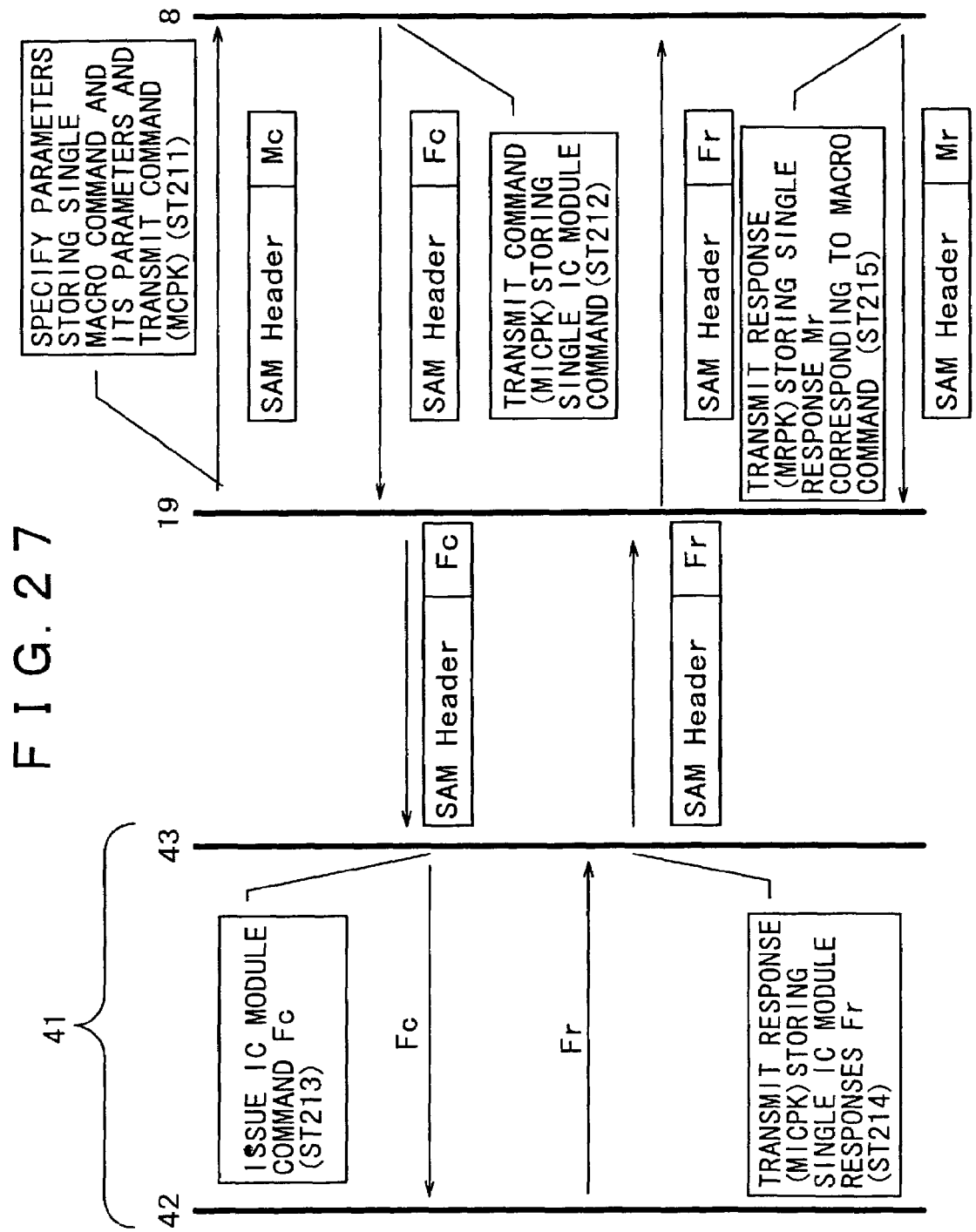
FIG. 27 is an explanatory diagram showing a first communication technique of a multi-command/response method adopted in the communication system shown in FIG. 1.

FIG. 27 is an explanatory diagram showing the first communication technique of the multi-command/response method adopted in the communication system 1 shown in FIG. 1.

Step ST211

The CPU 204 employed in the ASP server 19 shown in FIG. 16 creates a command packet (a first command according to the fourth to sixth aspects of the present invention) with the MCPK format shown in FIG. 24 and outputs the command packet to the SAM module 8 by way of the SAM interface unit 201. The SAM module 8 receives the command packet from the ASP server 19 through the ASPS communication interface unit 60 shown in FIG. 12. As shown in FIG. 24, the command packet includes a single command code for general-purpose macro command Mc (a first command according to the fourth to sixth aspects of the present invention).

Step ST212

The CPU 66 employed in the SAM module 8 interprets the single command code for general-purpose macro command Mc included in the MCPK command packet received at the step ST211 and then creates a command packet (a second command according to the fourth to sixth aspects of the present invention) with the MICPK format including a single IC-module command Fc (a second command according to the fourth to sixth aspects of the present invention) in the IC-module-command field of the MICPK format shown in FIG. 26 on the basis of a result of the interpretation. Then, the MICPK command packet is transmitted to the communication processing unit 43 employed in the portable communication apparatus 41 by way of the ASP server 19.

Step ST213

The communication processing unit 43 employed in the portable communication apparatus 41 passes on (issues) the single IC-module command Fc received at the step ST212 to the IC module 42 which then carries out processing according to the single IC-module command Fc. Then, the IC module 42 supplies a single response Fr (a response according to the fourth to sixth aspects of the present invention) including a result of the processing to the communication processing unit 43.

Step ST214

The communication processing unit 43 stores the single response Fr received at the step ST213 in the IC-module-response field of a response packet (a first response according to the fourth to sixth aspects of the present invention) with an MICPK format shown in FIG. 26 before transmitting the packet to the SAM module 8 by way of the ASP server 19.

Step ST215

The SAM module 8 creates a response packet (a second response according to the fourth to sixth aspects of the present invention) with the MRPK format shown in FIG. 25 by storing the single response Fr received at the step ST214 and a single response code Mr corresponding to the command code for general-purpose macro command specified in the MCPK command packet created at the step ST211. The SAM module 8 then transmits the MRPK response packet to the ASP server 19.

The first communication technique described above is adopted in processing such as basic data write and basic data read operations from the SAM module 8 to the IC module 42. In such processing, the maximum data size of data written into or read out from the IC module 42 is set at such a value that an upper limit of the performance of the IC module 42 is not exceeded.

In addition, as another typical application, the first communication technique is also adopted in execution of a 'Request System Codes' function to acquire the number of system codes in the IC module 42 or other functions.

It is to be noted that commands executed by adoption of the first communication technique correspond to individual commands specified by a third communication technique to be described later.

[Second Communication Technique]

A second communication technique of the multi-command/response method is an embodiment according to seventh to ninth aspects of the present invention.

Figure 28:
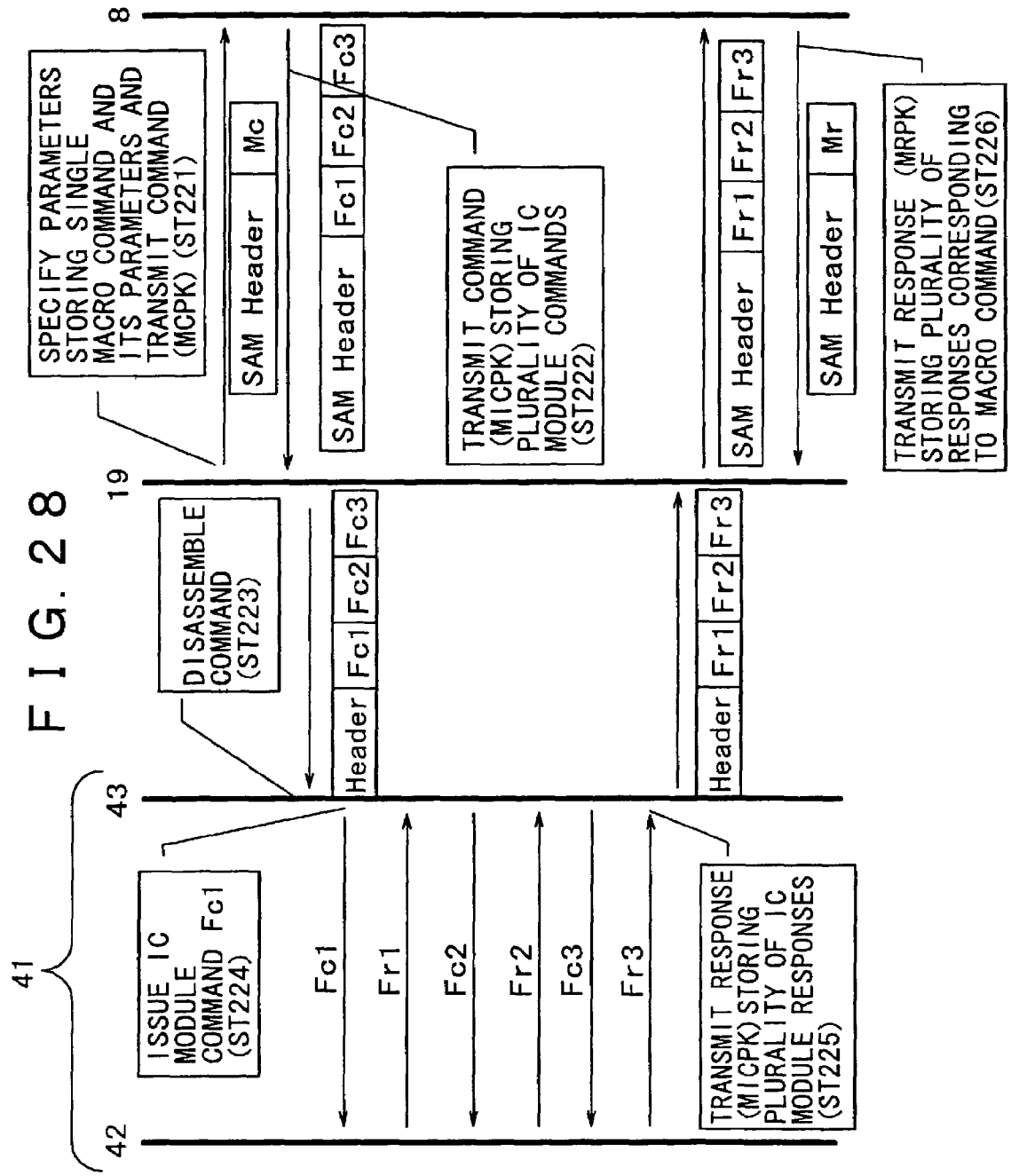
FIG. 28 is an explanatory diagram showing a second communication technique of the multi-command/response method adopted in the communication system shown in FIG. 1.

FIG. 28 is an explanatory diagram showing the second communication technique of the multi-command/response method adopted in the communication system 1 shown in FIG. 1.

Step ST221

The CPU 204 employed in the ASP server 19 shown in FIG. 16 creates a command packet (a first command according to the seventh to ninth aspects of the present invention) with the MCPK format shown in FIG. 24 and outputs the command packet to the SAM module 8 by way of the SAM interface unit 201. The SAM module 8 receives the command packet from the ASP server 19 through the ASPS communication interface unit 60 shown in FIG. 12. As shown in FIG. 24, the command packet includes a single command code for general-purpose macro command Mc (a first command according to the seventh to ninth aspects of the present invention).

Step ST222

The CPU 66 employed in the SAM module 8 interprets the single command code for general-purpose macro command Mc included in the MCPK command packet received at the step ST221 and then creates a command packet (a second command according to the seventh to ninth aspects of the present invention) with the MICPK format including a plurality of IC-module commands Fc1, Fc2 and Fc3 (second commands according to the seventh to ninth aspects of the present invention) in the IC-module-command fields of the MICPK format shown in FIG. 26 on the basis of a result of the interpretation. Then, the MICPK command packet is transmitted to the communication processing unit 43 employed in the portable communication apparatus 41 by way of the ASP server 19.

Step ST223

The communication processing unit 43 employed in the portable communication apparatus 41 separates the IC-module commands Fc1, Fc2 and Fc3 included in the IC-module command field and received at the step ST222 from each other. First of all, the communication processing unit 43 passes on (issues) the IC-module command Fc1 to the IC module 42.

Step ST224

The IC module 42 carries out processing according to the IC-module command Fc1 separated at the step ST223. The IC module 42 then supplies a response Fr1 including a result of the processing to the communication processing unit 43.

Subsequently, the communication processing unit 43 of the portable communication apparatus passes on (issues) the IC-module command Fc2 to the IC module 42.

The IC module 42 carries out processing according to the IC-module command Fc2. The IC module 42 then supplies a response Fr2 including a result of the processing to the communication processing unit 43.

Subsequently, the communication processing unit 43 of the portable communication apparatus passes on (issues) the IC-module command Fc3 to the IC module 42.

The IC module 42 carries out processing according to the IC-module command Fc3. The IC module 42 then supplies a response Fr3 including a result of the processing to the communication processing unit 43.

Step ST225

The communication processing unit 43 stores the single response Fr1, Fr2 and Fr3 (responses according to the seventh to ninth aspects of the present invention) received at the step ST224 in the IC-module response fields of the MICPK packet (a first response according to the seventh to ninth aspects of the present invention) shown in FIG. 26 before transmitting the packet to the SAM module 8 by way of the ASP server 19.

Step ST226

The SAM module 8 creates a response packet (a second response according to the seventh to ninth aspects of the present invention) with the MRPK format shown in FIG. 25 by storing the responses Fr1, Fr2 and Fr3 received at the step ST225 and a single response code Mr corresponding to the command code for general-purpose macro command specified in the MCPK command packet created at the step ST221. The SAM module 8 then transmits the MRPK response packet to the ASP server 19.

In accordance with the second communication technique described above, a sequence of fixed commands to be processed in a predetermined order is used. It is thus unnecessary for the ASP server 19 to transmit the commands individually along with their parameters to the SAM module 8, and the SAM module 8 merely needs to transmit the commands by storing them in an MICPK command packet.

To put it concretely, the second communication technique its effective for an application in which commands are executed as a pair with 'Change System Block' commands for confirming issuance processing such as IC-module issuance group commands. The IC-module issuance group commands include a service-cataloging command, an area-cataloging command, a division command, a service-deleting command and an area-deleting command.

[Third Communication Technique]

A third communication technique of the multi-command/response method is an embodiment according to tenth to twelfth aspects of the present invention.

Figure 29:
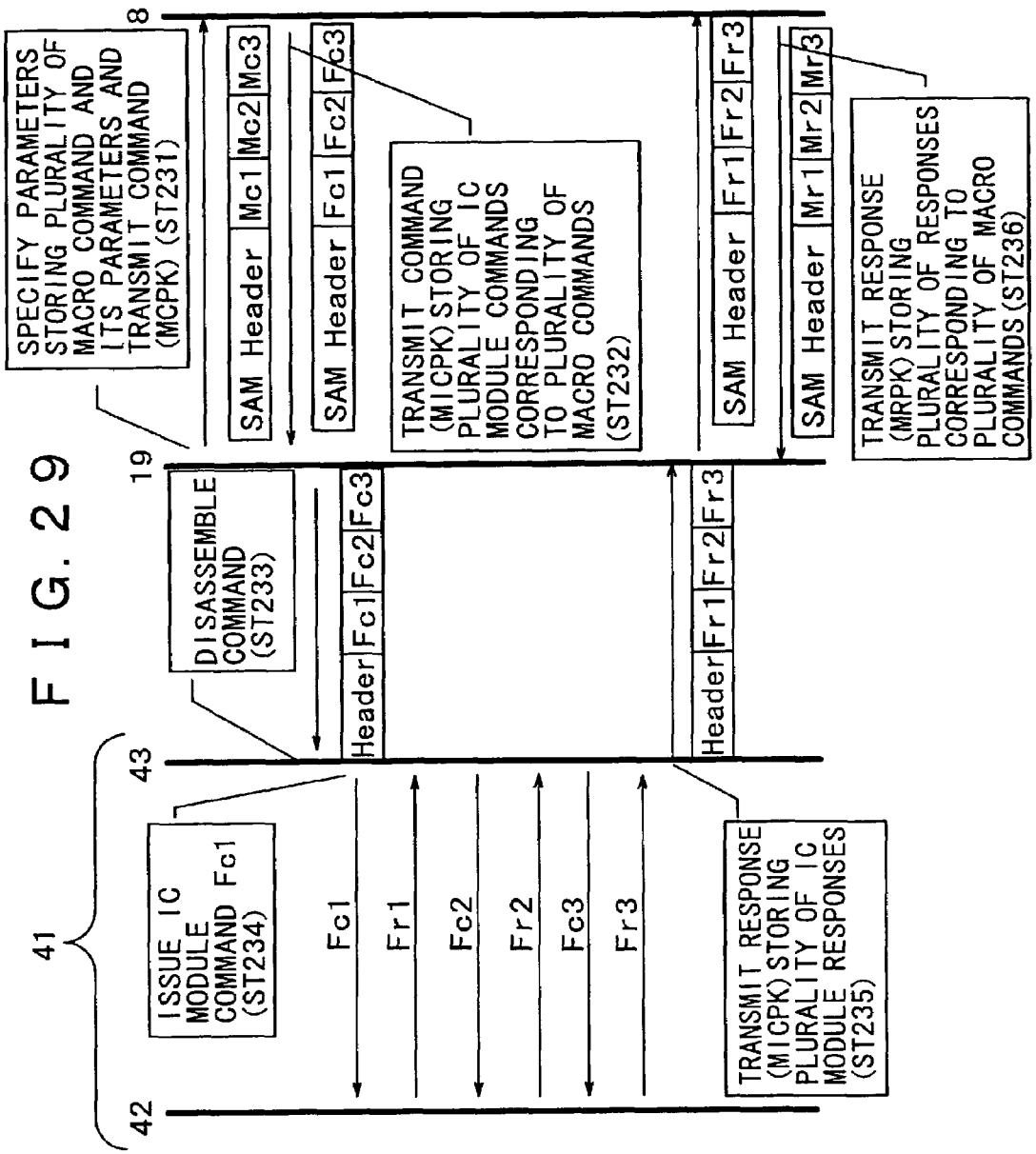
FIG. 29 is an explanatory diagram showing a third communication technique of the multi-command/response method adopted in the communication system shown in FIG. 1.

FIG. 29 is an explanatory diagram showing the third communication technique of the multi-command/response method adopted in the communication system 1.

Step ST231

The CPU 204 employed in the ASP server 19 shown in FIG. 16 creates a command packet (a first command according to the tenth to twelfth aspects of the present invention) with the MCPK format shown in FIG. 24 and outputs the command packet to the SAM module 8 by way of the SAM interface unit 201. The SAM module 8 receives the command packet from the ASP server 19 through the ASPS communication interface unit 60 shown in FIG. 12. As shown in FIG. 24, the command packet includes a plurality of command codes for general-purpose macro command Mc1, Mc2 and Mc3 (first commands according to the tenth to twelfth aspects of the present invention).

Step ST232

The CPU 66 employed in the SAM module 8 interprets the command codes for general-purpose macro command Mc1, Mc2 and Mc3 included in the MCPK command packet received at the step ST231 and then creates a command packet (a second command according to the tenth to twelfth aspects of the present invention) with the MICPK format including a plurality of IC-module commands Fc1, Fc2 and Fc3 (second commands according to the tenth to twelfth aspects of the present invention) in the IC-module-command fields of the MICPK format shown in FIG. 26 on the basis of a result of the interpretation. Then, the MICPK command packet is transmitted to the communication processing unit 43 employed in the portable communication apparatus 41 by way of the ASP server 19. The IC-module commands Fc1, Fc2 and Fc3 are determined in accordance with results of interpretation of the command codes for general-purpose macro command Mc1, Mc2 and Mc3 respectively.

Step ST233

The communication processing unit 43 employed in the portable communication apparatus 41 separates the IC-module commands Fc1, Fc2 and Fc3 included in the IC-module command fields and received at the step ST232 from each other. First of all, the communication processing unit 43 passes on (issues) the IC-module command Fc1 to the IC module 42.

Step ST234

The IC module 42 carries out processing according to the IC-module command Fc1 separated at the step ST233. The IC module 42 then supplies a response Fr1 including a result of the processing to the communication processing unit 43.

Subsequently, the communication processing unit 43 passes on (issues) the IC-module command Fc2 to the IC module 42.

The IC module 42 carries out processing according to the IC-module command Fc2. The IC module 42 then supplies a response Fr2 including a result of the processing to the communication processing unit 43.

Subsequently, the communication processing unit 43 of the portable communication apparatus passes on (issues) the IC-module command Fc3 to the IC module 42.

The IC module 42 carries out processing according to the IC-module command Fc3. The IC module 42 then supplies a response Fr3 including a result of the processing to the communication processing unit 43.

Step ST235

The communication processing unit 43 stores the responses Fr1, Fr2 and Fr3 (responses according to the tenth to twelfth aspects of the present invention) received at the step ST234 in the IC-module-response fields of the MICPK packet (a first response according to the tenth to twelfth aspects of the present invention) shown in FIG. 26 before transmitting the packet to the SAM module 8 by way of the ASP server 19.

Step ST236

The SAM module 8 creates a response packet (a second response according to the tenth to twelfth aspects of the present invention) with the MRPK format shown in FIG. 25 by storing the responses Fr1, Fr2 and Fr3 received at the step ST235 and response codes Mr1, Mr2 and Mr3 corresponding to respectively the command codes for general-purpose macro command Mc1, Mc2 and Mc3 specified in the MCPK command packet created at the step ST231. The SAM module 8 then transmits the MRPK response packet to the ASP server 19.

To put it concretely, the third communication technique described above is effective for an application in which a command to write or read out data into or from the IC module 42 is executed a plurality of times.

[Fourth Communication Technique]

A fourth communication technique of the multi-command/response method is an embodiment according to thirteenth to fifteenth aspects of the present invention. FIG. 30 is an explanatory diagram showing the fourth communication technique of the multi-command/response method adopted in the communication system 1.

Operations carried out by the SAM unit 9 taking the ASP server 19 as a point of vision by adoption of the fourth communication technique are the same as the operations carried out by the SAM unit 9 by adoption of the first communication technique. However, the fourth communication technique is different from the first communication technique in that, in the case of the fourth communication technique, information peculiar to the IC module stored in the SAM module 8 is used as a parameter for the next command. Thus, in accordance with a predetermined algorithm, the SAM module 8 finds a value of a parameter for a command to be executed next from a response to a command executed initially.

Step ST241

The CPU 204 employed in the ASP server 19 shown in FIG. 16 creates a command packet (a first command according to the twelfth to fifteenth aspects of the present invention) with the MCPK format shown in FIG. 24 and outputs the command packet to the SAM module 8 by way of the SAM interface unit 201. The SAM module 8 receives the command packet from the ASP server 19 through the ASPS communication interface unit 60 shown in FIG. 12. As shown in FIG. 24, the command packet includes a single command code for general-purpose macro command Mc (a first command according to the twelfth to fifteenth aspects of the present invention).

Step ST242

The CPU 66 employed in the SAM module 8 interprets the single command code for general-purpose macro command Mc included in the MCPK command packet received at the step ST241 and then creates a command packet (a second command according to the twelfth to fifteenth aspects of the present invention) with the MICPK format including a single IC-module command Fc1 (a second command according to the twelfth to fifteenth aspects of the present invention) in the IC-module-command field of the MICPK format shown in FIG. 26 on the basis of a result of the interpretation. Then, the MICPK command packet is transmitted to the communication processing unit 43 employed in the portable communication apparatus 41 by way of the ASP server 19.

Step ST243

The communication processing unit 43 employed in the portable communication apparatus 41 passes on (issues) the single IC-module command Fc1 received at the step ST242 to the IC module 42 which then carries out processing according to the single IC-module command Fc1. Then, the IC module 42 supplies a response Fr1 including a result of the processing to the communication processing unit 43.

Step ST244

The communication processing unit 43 stores the response Fr1 received at the step ST243 in the IC-module-response field of a response packet (a response according to the twelfth to fifteenth aspects of the present invention) with an MICPK format shown in FIG. 26 before transmitting the packet to the SAM module 8 by way of the ASP server 19.

Step ST245

The SAM module 8 creates a response packet (a third command according to the twelfth to fifteenth aspects of the present invention) with the MICPK format shown in FIG. 26 by storing a single IC-module command Fc2 (a third command according to the twelfth to fifteenth aspects of the present invention) specifying data of the response Fr1 received at the step ST244 as a parameter in the IC-module-command field of the MICPK format. Then, the MICPK command packet is transmitted to the communication processing unit 43 employed in the portable communication apparatus 41 by way of the ASP server 19.

Thereafter, the same processing as the step ST243 is carried out for the single IC-module command Fc2.

To put it concretely, the fourth communication technique described above is effective for an application to execute an authentication command with respect to a new storage area obtained as a result of execution of a division command to divide the storage area of the IC module. Since a system code after division of the storage area of the IC module is '0xFFFF', the IDm of the new area cannot be acquired specifically by using a polling command. For this reason, it is necessary to find the IDm of a post-division new area by using a certain algorithm and pass the IDm to an argument of the authentication command. This is because, if '0xFFFF' is specified as a system code by using a polling command, the system code will be interpreted as a wild IC module (card) so that it is impossible to acquire an IDm for the system area '0xFFFF' obtained as a result of division by execution of the same command.

FIG. 31 is an explanatory diagram showing a relation between the name of a macro command execution pattern and an implementation or commands to be utilized for the first to fourth communication techniques. It is to be noted that the SAM unit 9 selects one of the first to fourth communication techniques and implements it on the basis of a command packet received from the ASP server 19.

Figure 32:
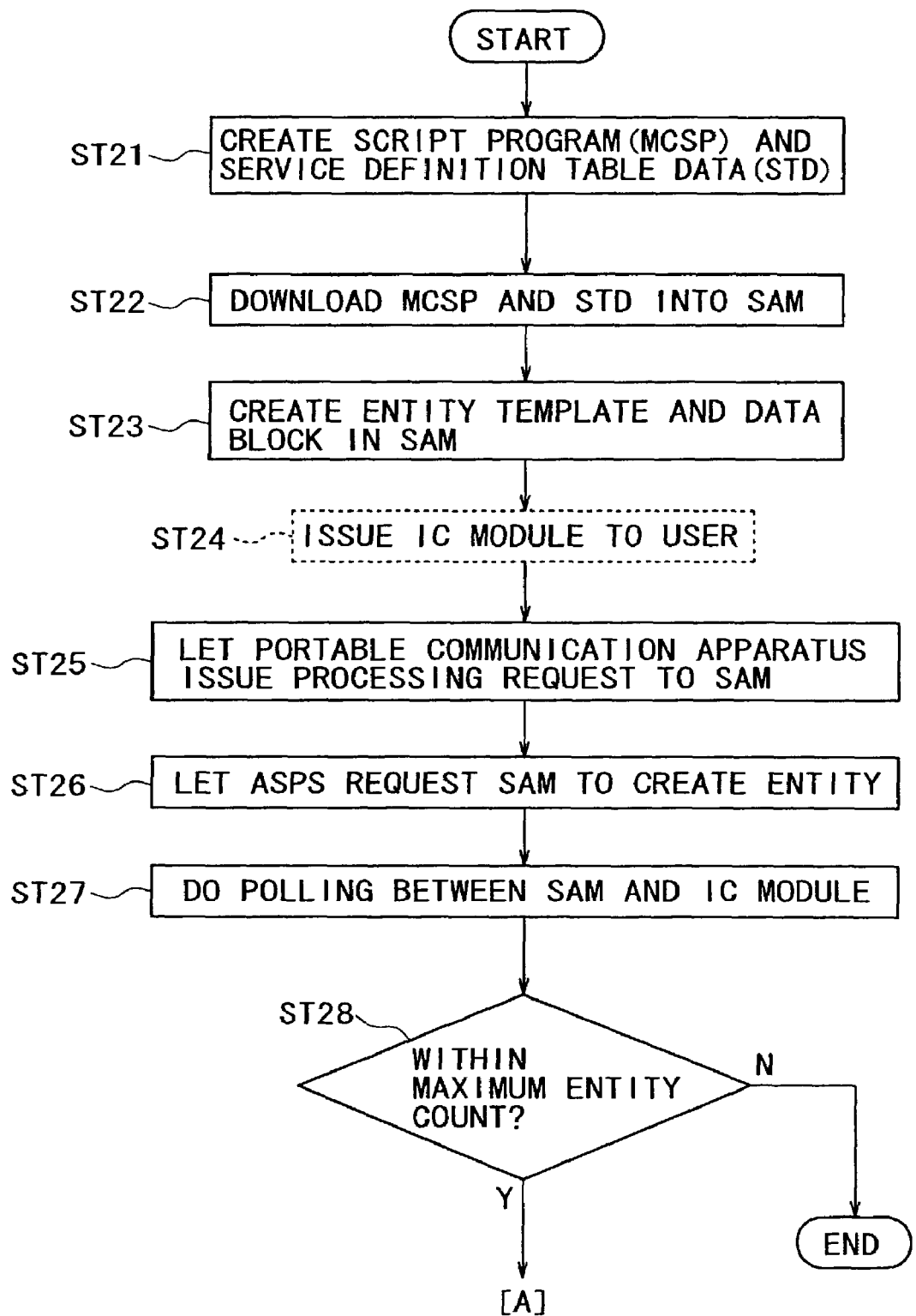
FIG. 32 shows a flowchart used for explaining the overall operation of the communication system shown in FIG. 1.
Figure 33:
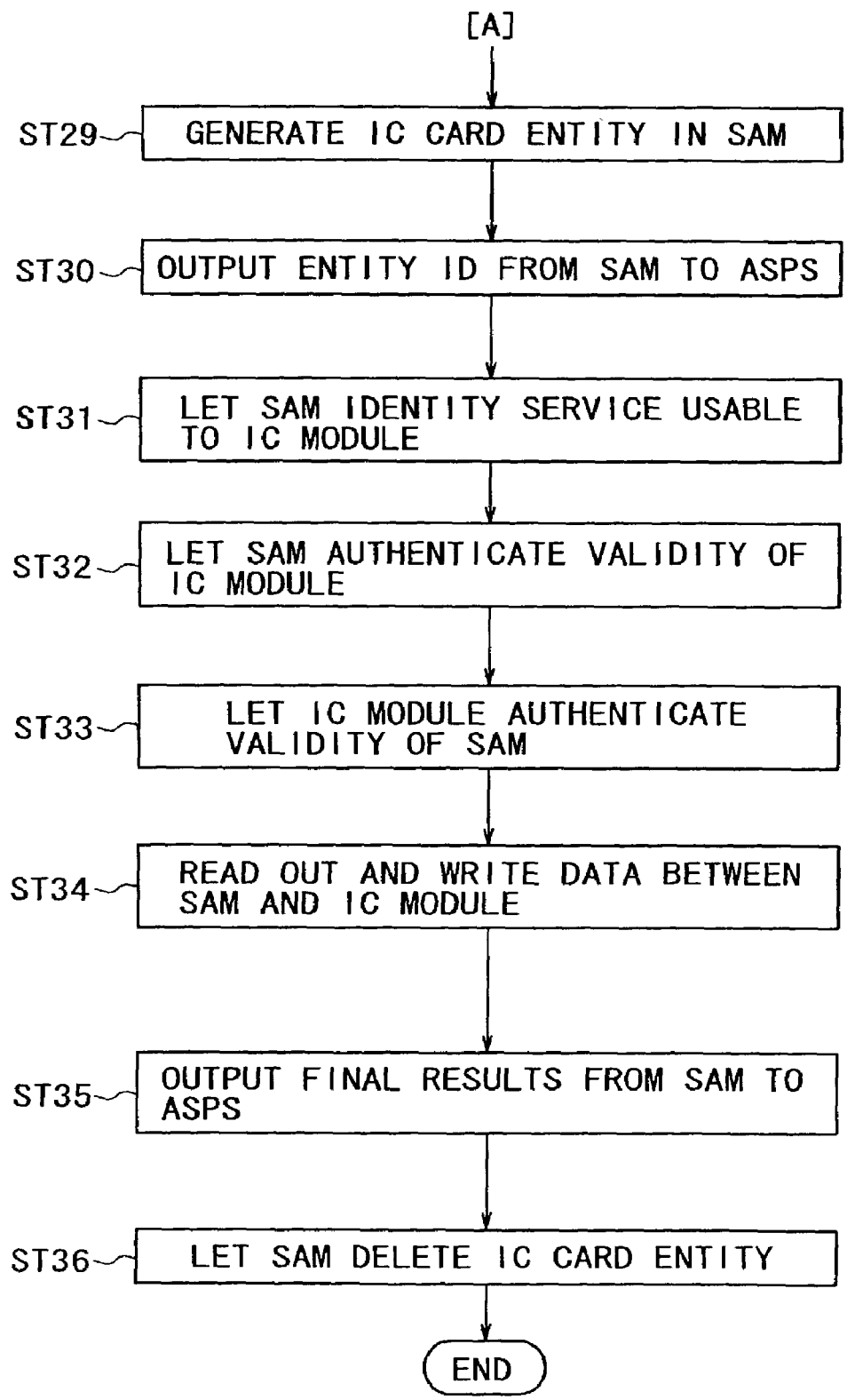
FIG. 33 shows a continuation of the above flowchart used for explaining the overall operation of the communication system shown in FIG. 1.

Next, the overall operation of the communication system 1 shown in FIG. 1 is explained. FIGS. 32 and 33 show a flowchart used for explaining the overall operation of the communication system 1 shown in FIG. 1.

Step ST21

The service-rendering enterprise 15_1 to 15_3 or a person receiving a request from the service-rendering enterprise 15_1 to 15_3 create script programs 21_1, 21_2 and 21_3 prescribing transactions using the IC module 42 on typically the personal computers 16_1, 16_2 and 16_3 shown in FIG. 1. In addition, the person in charge of management of the SAM module 8 creates AP management tables 300_1 to 300_3 for the service-rendering enterprise 15_1 to 15_3 respectively.

Step ST22

The AP management tables 300_1 to 300_3 created at the step ST21 are stored in the memory 7. In addition, the script programs 21_1, 21_2 and 21_3 created at the step ST21 are downloaded from the personal computers 16_1, 16_2 and 16_3 to the external memory 7 by way of the Internet 10, the ASP server 19 and the SAM module 8. As shown in FIG. 8, processing to download the script programs 21_1, 21_2 and 21_3 created at the step ST21 is controlled by the script download task 69 of the SAM module 8.

Step ST23

As shown in FIG. 8, the script interpretation task 70 of the SAM module 8 generates the IC card entity template input data block 31_x1, output data block 32_x2, log data block 33_x3 and processing definition data block 34_x4 by using the AP management tables 300_1 to 300_3 and script programs for each service-rendering enterprise. These data blocks are stored in the memory 65 of the SAM module 8 shown in FIG. 12.

Step ST24

The IC module 42 is issued to the user. The IC module 42 employed in the portable communication apparatus 41 shown in FIG. 5 is used for storing a key used in transactions with a service-rendering enterprise with which the user has made a contract. It is to be noted that a contract can also be made between the user and a service-rendering enterprise through typically the Internet 10 after issuance of the IC module 42.

Step ST25

Assume for example that the user uses the portable communication apparatus 41 to make an access to the server 2 through the Internet 10 in order to purchase a commodity. In this case, the server 2 issues a processing request to the ASP server 19 by way of the Internet 10. When receiving the processing request from the server 2, the ASP server 19 makes an access to the portable communication apparatus 41 through the Internet 10. The requested processing is processing using the IC module 42. The request for processing is transmitted by the communication processing unit 43 employed in the portable communication apparatus 41 to the SAM module 8 by way of the Internet 10 and the ASP server 19.

Step ST26

A request for creation of an entity is output from the ASP server 19 to the SAM module 8. The request for creation of an entity includes data indicating the issuer of the request, namely, the IC module 42.

Step ST27

When receiving the request for creation of an entity, the SAM module 8 conducts polling with the IC module 42.

Step ST28

The entity generation task 71 of the SAM module 8 forms a judgment as to whether or not the number of IC card entities 73_x existing in the SAM module 8 after the polling does not exceed a maximum value prescribed by an SC command of the script program. If the number of IC card entities 73_x does not exceed the maximum value, the flow of the processing goes on to a step ST29. Otherwise, the operation is ended.

Step ST29

The entity generation task 71 identifies a service-rendering enterprise, the IC card entity template of which is to be used, on the basis of data indicating the IC module 42 as the issuer of the request for creation of an entity. Such data is included in the request for creation of an entity. Then, the entity generation task 71 generates an IC card entity 73_x by using the IC card entity template of the identified service-rendering enterprise.

Step ST30

The SAM module 8 outputs the entity ID of the IC card entity 73_x generated at the step ST29 to the ASP server 19.

Step ST31

The IC card procedure management task 72 of the SAM module 8 examines services that can be used by using the IC module 42.

Step ST32

The IC card procedure management task 72 of the SAM module 8 authenticates the validity of the IC module 42.

Step ST33

The IC module 42 authenticates the validity of the SAM module 8. The authentications carried out at the steps ST32 and ST33 are referred to as mutual authentication between the IC module 42 and the SAM module 8. As described earlier, during the mutual authentication, in accordance with an application element APE executed in the SAM module 8, the AP management tables 300_1 to 300_3 shown in FIG. 10 are searched for a key K_CARD to be used in the mutual authentication between the CPU 51 employed in the IC module 42 and the SAM module 8.

Step ST34

The IC card procedure management task 72 of the SAM module 8 writes and reads out data necessary for the procedure into and from the IC module 42. In addition, the IC card procedure management task 72 also carries out predetermined processing on data read out from the IC module 42, by using a processing equation identified on the basis of the pre-processing data 86 of the IC card entity 73_x.

Step ST35

The IC card procedure management task 72 of the SAM module 8 outputs a result of the processing carried out at the step ST34 to the ASP server 19.

Step ST36

Typically, the IC card procedure management task 72 deletes the IC card entity 73_x.

As described above, in accordance with the communication system 1 and the SAM unit 9, a packet used by the SAM module 8 in a communication varies in dependence on processing not directly related to an operation of the IC module and processing directly implementing an operation of the IC module. Thus, the end user (that is, the service-rendering enterprise) is capable of easily customizing and implementing a processing procedure of the IC module and the structure of a packet with a high degree of freedom by prescribing a language (macro commands) for operating the IC module and setting the prescribed macro commands in the SAM module 8 as an application program AP.

Moreover, in accordance with the communication system 1 and the SAM unit 9, by using a temporary connection between the ASP server 19 and the SAM module 8 in execution of the operation of the IC module, a load balancer available in the market allows the load of the processing of the IC module to be distributed with ease among a plurality of SAM units 9 in a configuration comprising the same plurality of SAM modules 8 connected to the ASP server 19 serving as an upper-level computer, which puts the processing of the IC module in the same setting.

In addition, in accordance with the communication system 1 and the SAM unit 9, by using an IC-module processing protocol adopting the multi-command method, the number of communication lines connecting the portable communication apparatus 41 employing the IC module to the SAM module 8 can be decreased so that the effect of a line cut off by a sudden failure can also be reduced as well. This scheme is particularly effective for radio communication to exchange a packet between an IC module employed in an apparatus such as a handy phone and the SAM module 8.

Furthermore, in accordance with the communication system 1 and the SAM unit 9, a plurality of multi-command execution patterns are prepared for different scenarios of processing of the IC module. Thus, it is possible to provide a usage method suitable for any type of utilization of the IC module.

Moreover, in accordance with the communication system 1 and the SAM unit 9, an upper limit can be imposed on the number of connections of IC-module processing for each application program AP. It is thus possible to determine a fee to be charged to each service-rendering enterprise using the SAM module 8 in accordance with a maximum IC-module processing count.

In addition, in accordance with the communication system 1 and the SAM unit 9, a communication packet used by the SAM module 8 includes a field PCF for storing flags indicating whether or not mutual authentication is to be implemented between SAM units, whether the connection between the ASP server 19 and the SAM module 8 is temporary or fixed and whether a multi-command technique or a single-command technique is adopted. It is thus possible to identify the substance of processing carried out by the communication partner (that is, the ASP server 19).

Moreover, in accordance with the communication system 1 and the SAM unit 9, another SAM module 8 can be used as the communication partner of the SAM module 8 in addition to the ASP server 19.

Moreover, in accordance with the communication system 1 and the SAM unit 9, an application program AP is constructed by using a plurality of application elements APE and processing of each application element APE is prescribed by using an AP management table and an APP table. It is thus possible to render a variety of services using the IC module 42.

Furthermore, in accordance with the communication system 1, by using an AP management table and an APP table, it is possible to flexibly realize utilization of an application element APE in the same SAM unit and utilization of an application element APE between different SAM units while sustaining a high degree of security.

In addition, in accordance with the communication system 1, if an application element APE is utilized between different SAM units, mutual authentication between the SAM units is carried out. Thus, the security of the application program can be better assured.

As described above, in accordance with the present invention, it is possible to provide a data-processing apparatus capable of exchanging a variety of requests and various kinds of data, which are relevant to a rendered service using an IC (Integrated Circuit), among the SAM unit (the data-processing apparatus), the IC and the server with a high degree of efficiency in processing to render the service, provide a data-processing method adopted by the data-processing apparatus and provide a program implementing the data-processing method.

What is claimed is:

1. A communication method wherein an integrated circuit card or a portable communication device and a server communicate with each other to provide a service to a user of the integrated circuit card or the portable communication device by using data communication between an integrated circuit in the integrated circuit card or the portable communication device and a secure application module unit which communicate with the server, said secure application module unit including a secure application module and a memory which stores a plurality of application programs, the communication method comprising:

transmitting a first command packet data from the server to the secure application module, said first command packet data including a request for an operation of the integrated circuit;

interpreting the first command packet using the secure application module and generating a second command packet, the second command packet being at least partially encrypted and including operating instructions for the integrated circuit, the operating instructions being based on a result of the interpreting of the first command packet and the secure application module authenticating the operating instructions for the integrated circuit;

transmitting a second command packet data from the secure application module to the integrated circuit by way of the server;

processing the operating instructions included in the second command packet using the integrated circuit;

generating a first response packet data using the integrated circuit indicating a result of the processing performed based on the operating instructions in the second command packet;

transmitting the first response packet data from the integrated circuit to the secure application module to perform communication between the server and the integrated circuit card or the portable communication device judging, using the secure module, whether the integrated circuit has completed the processing based on the first response packet and generating a second response packet based on a result of the judging; and transmitting the second response packet data from the secure module to the server indicating completion of the processing by the integrated circuit.

2. A communication method according to claim 1 wherein: said first and second command packet data and said first and second response packet data exchanged between said server and the secure application module include an indicator indicating whether or not said server or the secure application module needs to carry out an operation for said processing;

on the basis of said indicator, said server or the secure application module carries out said operation to said first and second command packet data or said first and second response packet data.

3. A communication method according to claim 1 wherein: said first and second command packet data and said first and second response packet data exchanged between said server and the secure application module include an indicator indicating whether a communication route between said server and the secure application module is to be established as a permanent communication route or a temporary communication route which exists on a temporary basis only during a session of exchanging said first command data packet and said second response data packet; and said server and the secure application module establish said communication route in accordance with said indicator and exchanges said first command data packet and said second response data packet through said established communication route.

4. A communication method according to claim 1 wherein: said first and second command data packets and said first and second response data packets exchanged between said server and the secure application module include an indicator indicating whether or not a mutual authentication is to be carried out between said server and the secure application module; and on the basis of said indicator, said server and the secure application module make a decision as to whether or not a mutual authentication is to be carried out between said server and the secure application module.

5. A communication method according to claim 1 wherein: said second command data packet includes a single command or a plurality of commands requesting said integrated circuit to carry out a series of processes; and said integrated circuit interprets said commands included in said second command data packet in order to execute said commands.

6. A communication method according to claim 1 wherein: said first and second command data packets and said first and second response data packets exchanged between said server and the secure application module include an indicator indicating whether said command/response includes a single command/response or a plurality of commands/responses respectively;

said server or the secure application module carries out processing in accordance with said indicator.

7. A communication method according to claim 1 wherein, for an application of a plurality of secure application modules carrying out communication with said integrated circuit by way of said server, a load-balance-processing apparatus provided between said server and the secure application modules carries out processing to distribute a processing load among the secure application modules.

8. A secure application module including: a processor and a computer readable storage medium used for providing a predetermined service by carrying out communications with an integrated circuit in an integrated circuit card or a portable communication device through a server, said secure application module provided with an interface means for carrying out communications with said server and provided with a control means for: receiving, from said server, a first command packet data including a request for an operation of said integrated circuit;

interpreting said first command packet data and generating a second command packet data, the second command packet data being at least partially encrypted and including operating instructions for the integrated circuit, the operating instructions being based on a result of the interpreting of the first command packet data and the secure application module authenticating the operating instructions for the integrated circuit;
  transmitting to said integrated circuit by way of said server the second command packet data;
  receiving a first response packet data containing a result of a processing carried out by said integrated circuit in accordance with said second command packet data;
  judging whether the integrated circuit has completed the processing based on the first response packet data and generating a second response packet data based on a result of the judging; and
  transmitting the second response packet data from the secure module to the server indicating completion of said processing by the integrated circuit.

9. A program stored on a computer readable storage medium to be executed by a secure application module for providing a predetermined service by carrying out communications with an integrated circuit in an integrated circuit card or a portable communication device through a server, said program comprising procedures of:

receiving, from said server, a first command packet data including a request for an operation of said integrated circuit;
  interpreting said first command packet data and generating a second command packet data, the second command packet data being at least partially encrypted and including operating instructions for the integrated circuit, the operating instructions being based on a result of the interpreting of the first command packet data and the secure application module authenticating the operating instructions for the integrated circuit;
  transmitting to said integrated circuit by way of said server the second command packet data;
  receiving a first response packet data containing a result of a processing carried out by said integrated circuit in accordance with said second command packet data;
  judging whether the integrated circuit has completed the processing based on the first response packet data and generating a second response packet data based on a result of the judging; and
  transmitting the second response packet data from the secure module to the server indicating completion of said processing by the integrated circuit.

10. A communication method wherein an integrated circuit card or a portable communication device and a server communicate with each other to provide a service to a user of the integrated circuit card or the portable communication device by using data communication between an integrated circuit in the integrated circuit card or the portable communication device and a secure application module unit which communicate with the server, said secure application module unit including a secure application module and a memory which stores a plurality of application programs, the communication method comprising:

transmitting a first command packet data including a single first command from the server to the secure application module, said single first command requesting an operation of the integrated circuit;
  interpreting the single first command using the secure application module and generating a second command data packet being at least partially encrypted and including a second command, the second command including operating instructions for the integrated circuit, the operating instructions being based on a result of the interpreting of the first command and the secure application module authenticating the operating instructions for the integrated circuit; and
  transmitting the second command packet data including the second command from the secure application module to the integrated circuit by way of the server.

11. A communication method according to claim 10 further comprising:

processing the operating instructions included in the second command packet using the integrated circuit;
  generating a first response packet data using the integrated circuit indicating a result of the processing performed based on the operating instructions in the second command packet;
  transmitting the first response packet data from the integrated circuit to the secure application module to perform communication between the server and the integrated circuit card or the portable communication device;
  judging, using the secure module, whether the integrated circuit has completed the processing based on the first response packet and generating a second response packet based on a result of the judging; and
  transmitting the second response packet data from the secure module to the server indicating completion of the processing by the integrated circuit.

12. A secure application module including: a processor and a computer readable storage medium used for providing a predetermined service by carrying out communications with an integrated circuit in an integrated circuit card or a portable communication device through a server, said secure application module provided with an interface means for carrying out communications with said server and provided with a control means for:

receiving, from said server, a first command packet data including a single first command requesting an operation of said integrated circuit;
  interpreting single first command included in said first command packet data and generating a second command being at least partially encrypted and included in a second command packet data, the second command including operating instructions for the integrated circuit, the operating instructions being based on a result of the interpreting of the first command packet data and the secure application module authenticating the operating instructions for the integrated circuit; and transmitting to said integrated circuit by way of said server the second command packet data including the second command.

13. A program stored on a computer readable storage medium to be executed by a secure application module for providing a predetermined service by carrying out communications with an integrated circuit in an integrated circuit card or a portable communication device through a server, said program comprising procedures of:

receiving, from said server, a first command packet data including a single first command requesting an operation of said integrated circuit;

interpreting single first command included in said first command packet data and generating a second command included in a second command packet data, the second command being at least partially encrypted and including operating instructions for the integrated circuit, the operating instructions being based on a result of the interpreting of the first command packet data and the secure application module authenticating the operating instructions for the integrated circuit; and transmitting to said integrated circuit by way of said server the second command packet data including the second command.

14. A communication method wherein an integrated circuit card or a portable communication device and a server communicate with each other to provide a service to a user of the integrated circuit card or the portable communication device by using data communication between an integrated circuit in the integrated circuit card or the portable communication device and a secure application module unit which communicate with the server, said secure application module unit including a secure application module and a memory which stores a plurality of application programs, the communication method comprising:

transmitting a first command packet data including a single first command from the server to the secure application module, said single first command requesting an operation of the integrated circuit;

interpreting the single first command using the secure application module and generating a second command data packet being at least partially encrypted and including a plurality of second commands, the second commands including operating instructions for the integrated circuit, the operating instructions being based on a result of the interpreting of the first command and the secure application module authenticating the operating instructions for the integrated circuit; and transmitting the second command packet data including a plurality of second commands from the secure application module to the integrated circuit by way of the server.

15. A communication method according to claim 14 further comprising: processing the operating instructions included in the second command packet using the integrated circuit;

generating a first response packet data using the integrated circuit indicating a result of the processing performed based on the operating instructions in the second command packet;

transmitting the first response packet data from the integrated circuit to the secure application module to perform communication between the server and the integrated circuit card or the portable communication device;

judging, using the secure module, whether the integrated circuit has completed the processing based on the first response packet and generating a second response packet based on a result of the judging; and transmitting the second response packet data from the secure module to the server indicating completion of the processing by the integrated circuit.

16. A secure application module including: a processor and a computer readable storage medium used for providing a predetermined service by carrying out communications with an integrated circuit in an integrated circuit card or a portable communication device through a server, said secure application module provided with an interface means for carrying out communications with said server and provided with a control means for:

receiving, from said server, a first command packet data including a single first command requesting an operation of said integrated circuit;

interpreting single first command included in said first command packet data and generating a plurality of second commands included in a second command packet data, the second command packet data being at least partially encrypted and the plurality of second commands including operating instructions for the integrated circuit, the operating instructions being based on a result of the interpreting of the first command packet data and the secure application module authenticating the operating instructions for the integrated circuit; and transmitting to said integrated circuit by way of said server the second command packet data including the plurality of second commands.

17. A program stored on a computer readable storage medium to be executed to be executed by a secure application module for providing a predetermined service by carrying out communications with an integrated circuit in an integrated circuit card or a portable communication device through a server, said program comprising procedures of:

receiving, from said server, a first command packet data including a single first command requesting an operation of said integrated circuit;

interpreting single first command included in said first command packet data and generating a plurality of second commands included in a second command packet data, the second command packet data being at least partially encrypted and the plurality of second commands including operating instructions for the integrated circuit, the operating instructions being based on a result of the interpreting of the first command packet data and the secure application module authenticating the operating instructions for the integrated circuit; and transmitting to said integrated circuit by way of said server the second command packet data including the plurality of second commands.

18. A communication method wherein an integrated circuit card or a portable communication device and a server communicate with each other to provide a service to a user of the integrated circuit card or the portable communication device by using data communication between an integrated circuit in the integrated circuit card or the portable communication device and a secure application module unit which communicate with the server, said secure application module unit including a secure application module and a memory which stores a plurality of application programs, the communication method comprising:

transmitting a first command packet data including a plurality of first commands from the server to the secure application module, each of said first commands requesting an operation of the integrated circuit;

interpreting the single first commands using the secure application module and generating a second command data packet including a plurality of second commands, the second command data packet being at least partially encrypted and the second commands including operating instructions for the integrated circuit, the operating instructions being based on a result of the interpreting of the first commands and the secure application module authenticating the operating instructions for the integrated circuit; and transmitting the second command packet data including a plurality of second commands from the secure application module to the integrated circuit by way of the server.

19. A secure application module including: a processor and a computer readable storage medium used for providing a predetermined service by carrying out communications with an integrated circuit in an integrated circuit card or a portable communication device through a server, said secure application module provided with an interface means for carrying out communications with said server and provided with a control means for:

receiving, from said server, a first command packet data including a plurality of first commands each requesting an operation of said integrated circuit; interpreting said first commands included in said first command packet data and generating a plurality of second commands included in a second command packet data, the second command packet data being at least partially encrypted and the plurality of second commands including operating instructions for the integrated circuit, the operating instructions being based on a result of the interpreting of the plurality of first commands and the secure application module authenticating the operating instructions for the integrated circuit; and transmitting to said integrated circuit by way of said server the second command packet data including the plurality of second commands.

20. A program stored on a computer readable storage medium to be executed to be executed by a secure application module for providing a predetermined service by carrying out communications with an integrated circuit in an integrated circuit card or a portable communication device through a server, said program comprising procedures of:

receiving, from said server, a first command packet data including a plurality of first commands each requesting an operation of said integrated circuit;

interpreting said first commands included in said first command packet data and generating a plurality of second commands included in a second command packet data, the second command packet data being at least partially encrypted and the plurality of second commands including operating instructions for the integrated circuit, the operating instructions being based on a result of the interpreting of the plurality of first commands and the secure application module authenticating the operating instructions for the integrated circuit; and transmitting to said integrated circuit by way of said server the second command packet data including the plurality of second commands.

21. A communication method wherein an integrated circuit card or a portable communication device and a server communicate with each other to provide a service to a user of the integrated circuit card or the portable communication device by using data communication between an integrated circuit in the integrated circuit card or the portable communication device and a secure application module unit which communicate with the server, said secure application module unit including a secure application module and a memory which stores a plurality of application programs, the communication method comprising:

transmitting a first command packet data including a single first command from the server to the secure application module, said single first command requesting an operation of the integrated circuit;

interpreting the first command using the secure application module and generating a second command packet including a second command, the second command packet being at least partially encrypted and the second command including operating instructions for the integrated circuit, the operating instructions being based on a result of the interpreting of the first command and the secure application module authenticating the operating instructions for the integrated circuit;

transmitting the second command packet data including the second command from the secure application module to the integrated circuit by way of the server;

processing the operating instructions included in the second command packet using the integrated circuit;

generating a first response packet data using the integrated circuit indicating a result of the processing performed based on the operating instructions in the second command;

transmitting the first response packet data from the integrated circuit to the secure application module;

judging, using the secure module, whether the integrated circuit has completed the processing based on the first response packet and generating a third command packet including a third command based on a result of the judging; and transmitting the third command packet data including the third command from the secure application module to the to said integrated circuit by way of said server.

22. A secure application module including: a processor and a computer readable storage medium used for providing a predetermined service by carrying out communications with an integrated circuit in an integrated circuit card or a portable communication device through a server, said secure application module provided with an interface means for carrying out communications with said server and provided with a control means for:

receiving, from said server, a first command packet data including a single first command requesting an operation of said integrated circuit;

interpreting said single first command included in said first command packet data and generating a second command included in a second command packet data, the second command packet data being at least partially encrypted and the second command including operating instructions for the integrated circuit, the operating instructions being based on a result of the interpreting of the first command packet data and the secure application module, authenticating the operating instructions for the integrated circuit;

transmitting to said integrated circuit by way of said server the second command packet data including the second command;

receiving a response from said server, which has received said response from said integrated circuit; and transmitting to said integrated circuit by way of said server a third command packet data including a single third command created by using a processing result included in said response.

23. A program stored on a computer readable storage medium to be executed to be executed by a secure application module for providing a predetermined service by carrying out communications with an integrated circuit in an integrated circuit card or a portable communication device through a server, said program comprising procedures of:

receiving, from said server, a first command packet data including a single first command requesting an operation of said integrated circuit;

interpreting said single first command included in said first command packet data and generating a second command included in a second command packet data, the second command packet data being at least partially encrypted and the second command including operating instructions for the integrated circuit, the operating instructions being based on a result of the interpreting of the first command packet data and the secure application module authenticating the operating instructions for the integrated circuit;

transmitting to said integrated circuit by way of said server the second command packet data including the second command;

receiving a response from said server, which has received said response from said integrated circuit; and transmitting to said integrated circuit by way of said server a third command packet data including a single third command created by using a processing result included in said response.

* * * * *